United States Patent
Gorges et al.

(10) Patent No.: US 12,017,626 B1
(45) Date of Patent: Jun. 25, 2024

(54) HIGH EFFICIENCY MECHANICAL EMERGENCY BRAKE WITH MANUAL OVERRIDE

(71) Applicant: Amazon Technologies, Inc., Seattle, WA (US)

(72) Inventors: Jeffrey Joseph Gorges, Seattle, WA (US); Timothy James Ong, Redmond, WA (US); Nicolas Guillaume Hostein, Seattle, WA (US); Joseph C. Hager, Seattle, WA (US); Ennio Claretti, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 867 days.

(21) Appl. No.: 17/118,167

(22) Filed: Dec. 10, 2020

(51) Int. Cl.
| | |
|---|---|
| *B60T 7/02* | (2006.01) |
| *B60T 1/00* | (2006.01) |
| *B65G 1/04* | (2006.01) |
| *B60P 3/00* | (2006.01) |

(52) U.S. Cl.
CPC .............. *B60T 7/02* (2013.01); *B60T 1/005* (2013.01); *B65G 1/0492* (2013.01); *B60P 3/007* (2013.01); *B60T 2270/402* (2013.01)

(58) Field of Classification Search
CPC ........ B60T 7/02; B60T 1/005; B60T 8/17558; B60T 2270/402; B65G 1/0492; B60P 3/007
See application file for complete search history.

(56) References Cited

U.S. PATENT DOCUMENTS

| | | | | |
|---|---|---|---|---|
| 10,061,313 | B2* | 8/2018 | Letwin | G05D 1/86 |
| 11,059,373 | B1* | 7/2021 | Claretti | G01S 17/86 |
| 11,883,955 | B1* | 1/2024 | Smith | B25J 19/0095 |

FOREIGN PATENT DOCUMENTS

| | | | | |
|---|---|---|---|---|
| DE | 102017125491 A1 * | 5/2018 | | B60K 6/38 |
| DE | 102020100637 B3 * | 7/2021 | | B60K 7/0007 |

* cited by examiner

*Primary Examiner* — Vishal R Sahni
(74) *Attorney, Agent, or Firm* — Kilpatrick Townsend & Stockton LLP

(57) ABSTRACT

A mechanical design for a braking system of a delivery device is described. The braking system includes one or more brake modules. Each brake module is configured to engage a different wheel of the delivery device to stop movement of the wheel when power to the brake module is less than a threshold. Each brake module includes: an electromagnet; a magnetic plate; a pawl configured to engage a wheel to stop movement of the wheel; a solenoid comprising a solenoid pin, the solenoid pin having a first end coupled to the magnetic plate and having a second end coupled to the pawl, and a manual override mechanism that is configured to allow movement of the wheel when the power to the brake module is less than the threshold. The brake module is configured to disable the manual override mechanism when the power to the brake module is greater than or equal to a threshold.

20 Claims, 18 Drawing Sheets

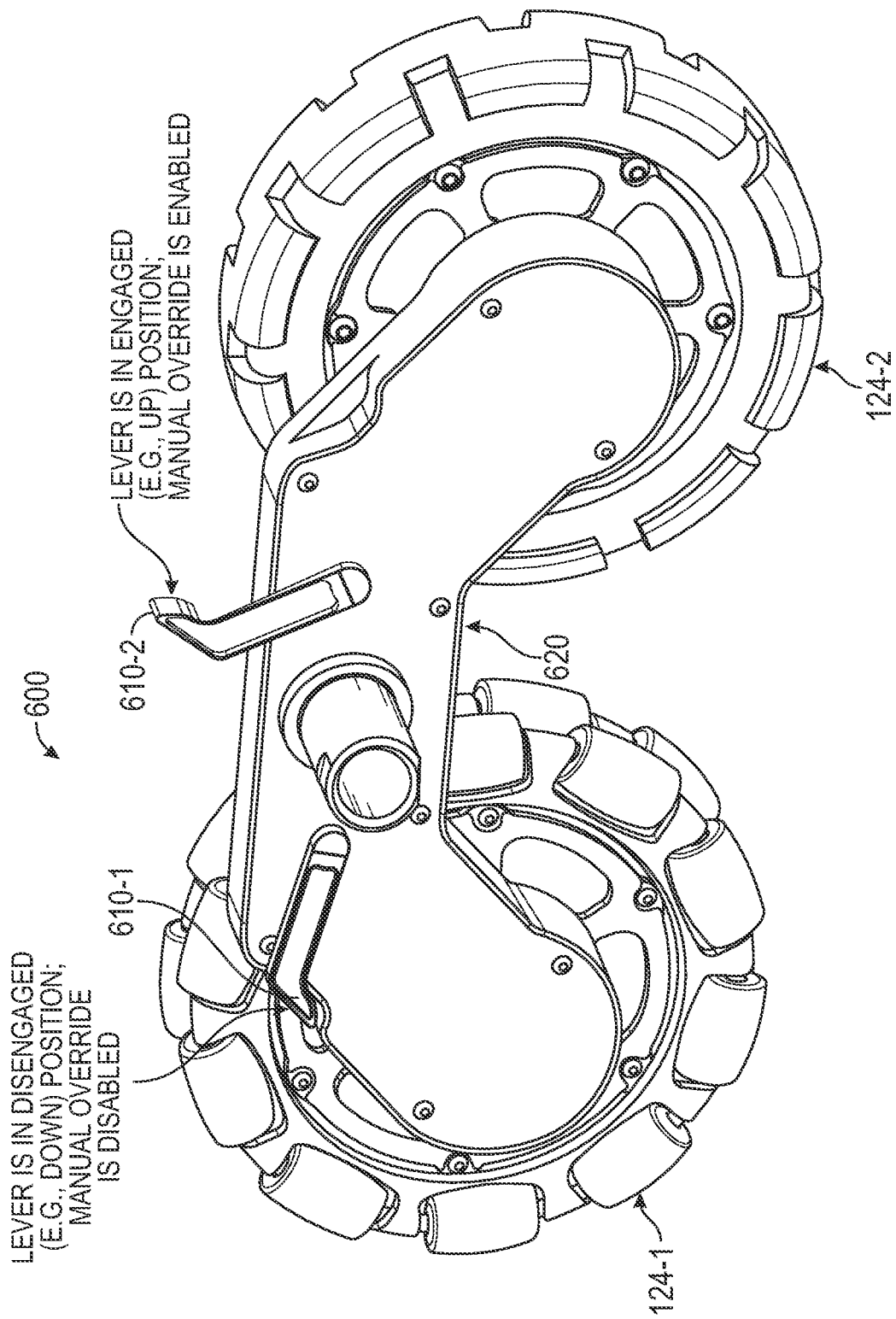

HIGH EFFICIENCY MECHANICAL EMERGENCY BRAKE WITH MANUAL OVERRIDE

BACKGROUND

The present invention relates to delivery devices, and more specifically, to a mechanical design of a braking system of a delivery device.

Many companies package and ship items (e.g., books, apparel, food, electronics, etc.) and/or groups of items in order to fulfill order requests from customers. For example, ordered items are typically packed in shipping packages and shipped to the customer's residence or place of business. The delivery of physical items to a customer's specified location is traditionally accomplished using a delivery system include a human controlled truck, human operated bicycle, human operated cart, etc. In some cases, delivery devices (e.g., robots, autonomous ground vehicles (AGVs), personal delivery devices, etc.) can be used to aid the delivery of items to specified locations (e.g., users' residences). For example, a delivery device can retrieve an item(s) from a loading area (e.g., transportation vehicle, facility, etc.) and travel to a specified delivery location (e.g., user residence) to deliver the item. The delivery device can return back to the loading area when the item has been delivered.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 6D illustrates another perspective view of a brake assembly for a delivery device, according to one embodiment.

DETAILED DESCRIPTION

Figure 1:
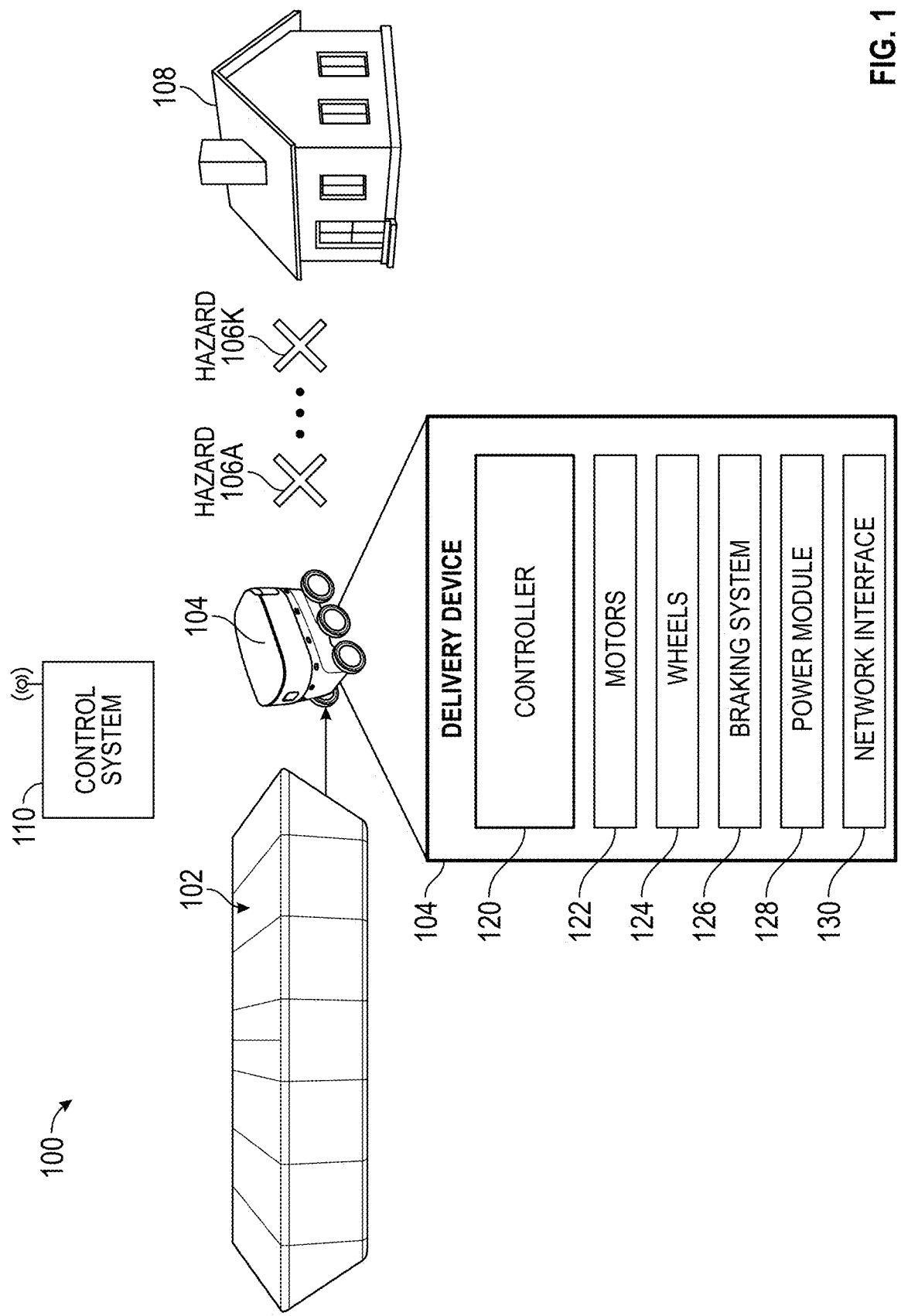
FIG. 1 illustrates an example environment in which one or more delivery devices are deployed to deliver items, according to one embodiment.

A delivery device can encounter various different types of safety hazards when traveling to a location (e.g., delivery location, dispatch (or hub) location, etc.). Examples of such safety hazards can include, but are not limited to, weather hazards (e.g., thunderstorms, hail, wind, etc.), road (or sidewalk) hazards (e.g., ice, potholes, uneven road segments, steep inclines, hills, etc.), traffic hazards (e.g., pedestrian activity), and the like. In response to detecting a hazard, the delivery device should be able to consistently apply its brakes in order to stop its movement, e.g., to mitigate accidents (or damage) to pedestrians and/or property.

Embodiments herein describe a mechanical design for a braking system of a delivery device. As described below, in some embodiments, the braking system includes one or more brake modules, each of which is configured to engage a different wheel of the delivery device to stop the wheeled motion of the wheel when certain conditions are satisfied. In one example, a given brake module can be configured to engage a respective wheel in response to a hazard. For instance, a controller of the delivery device can send a command to remove power from the brake module in response to detecting a hazard. In another example, a given brake module can be configured to engage a respective wheel when the brake module loses power (e.g., due to a power failure). In yet another example, the brake module can be used to prevent rolling of its respective wheel while the delivery device is in a powered off state (e.g., when the delivery device is parked or docked).

In some embodiments, one or more brake modules of the braking system can include a manual override mechanism, which enables a user to manually engage and/or manually disengage one or more of the brake modules. As described below, the manual override mechanism can be used to allow a user to manually operate the delivery device, while the delivery device is in a powered off state.

Additionally, in some embodiments, one or more brake modules of the braking system can include an automatic manual override return mechanism. As described below, the automatic manual override return mechanism is configured to return the manual override mechanism for a given brake module to an unused state (e.g., disengaged or disabled state) in the event the brake module is powered on while the manual override state of brake module is enabled. As such, the automatic manual override return mechanism can prevent inadvertent operation of the brake module without the ability to engage the brake module in the event of an emergency (e.g., power failure, hazard(s), etc.).

In this manner, embodiments provide an efficient, low power mechanical braking system for a delivery device that can engage the delivery device in emergencies. Note that as used herein, a delivery device may also be referred to as an AGV, a robot, a delivery robot, a personal delivery device, an autonomous delivery robot, etc. Further, as used herein, the delivery device and/or one or more components of the delivery device (e.g., braking system, brake module(s), etc.) may be unpowered when power to the delivery device and/or one or more components of the delivery device is less than a threshold power. Similarly, the delivery device and/or one or more components of the delivery device (e.g., braking system, brake module(s), etc.) may be powered (or powered on) when power to the delivery device and/or one or more components of the delivery device is greater than or equal to the threshold power.

FIG. 1 illustrates an example environment 100 in which one or more delivery devices 104 can be deployed to deliver items, according to one embodiment. For example, the environment 100 can be an outdoor environment in which a delivery device 104 is moving on a sidewalk (or other type of terrain). As shown, the environment 100 includes a dispenser 102 (or hub apparatus), a delivery device 104, and a control system 110. Note that, for the sake of clarity, a single delivery device 104 is depicted in FIG. 1. In other embodiments, multiple delivery devices 104 can be deployed in the environment 100.

The dispenser 102 can be used for housing and dispatching delivery devices 104. In one embodiment, the dispenser 102 may be located in a geographical area in proximity to one or more delivery locations, such as delivery destination 108. Although the dispenser 102 is illustrated with a particular configuration in FIG. 1, note that the dispenser 102 can have a variety of different configurations (e.g., shape, material, angle, height, covering (or housing), etc.) suitable for docking one or more delivery devices 104. In some embodiments, for example, the dispenser 102 can include docking station(s) that provide charging and/or network connectivity for the delivery devices 104 docked in the station(s). In some examples, the dispenser 102 can be enclosed (as shown in FIG. 1), open, or at least partially covered by another structure.

The control system 110 can include hardware components, software components, or combinations thereof. For example, although not shown, the control system 110 can include a controller, network interface, etc., for controlling operation of the dispenser 102 and/or delivery devices 104. In some embodiments, one or more components of the control system 110 may be distributed across one or more computing systems in a cloud environment. In some embodiments, the control system 110 can control operation of the dispenser 102, e.g., via control signals (or commands) transmitted to the dispenser 102 over a network. For example, the control system 110 can provide control signals (or commands) to the dispenser 102 to open and close access barriers of the dispenser 102 to allow delivery devices 104 to enter and exit the dispenser 102, engage and disengage locking mechanisms at one or more docking stations within the dispenser 102, etc.

In some embodiments, the control system 110 can control operation of the delivery device 104, e.g., via control signals (or commands) transmitted to the delivery device 104 over a network. For example, the control system 110 can instruct one or more of the delivery devices 104 to enter and/or exit the dispenser 102, instruct one or more of the delivery devices 104 to transition to a particular docking station or other location within the dispenser 102, instruct one or more of the delivery devices 104 to travel to a particular location (e.g., delivery destination 108, dispatch location, etc.), power up one or more of the delivery devices 104 (including one or more components of the delivery devices 104), power down one or more of the delivery devices 104 (including one or more components of the delivery devices 104), etc.

In the embodiment depicted in FIG. 1, a delivery device 104 may receive an item (e.g., at the dispenser 102 or from another location) and be dispatched to a delivery destination 108 (e.g., a residence, a business, etc.) in order to deliver the item. The delivery device 104 includes a controller 120, one or more motors 122, a set of wheels 124, a braking system 126, a power module 128, and a network interface 130. The controller 120 controls the operation of the delivery device 104, e.g., based on signals received via the network interface 130 from the control system 110 and/or from another computing system (not shown). Although not shown, the delivery device 104 may also include one or more sensors that enable the delivery device 104 to detect hazards that may be in a travel path of the delivery device 104, enable the device 104 to navigate to a location, etc. The sensors can include, but are not limited to, image (camera) sensors, thermal sensors, infrared sensors, position/location (e.g., GPS) sensors, weather sensors, time of travel sensors, accelerometers, sound sensors, proximity sensors, etc. Using the sensors, the delivery device 104 can detect hazards (e.g., debris, doors, persons, traffic, etc.) in its travel path, navigate around the obstacles, and the like.

The delivery device 104 is equipped with a set of wheels 124. In one particular embodiment, the delivery device 104 includes six wheels, where two of the six wheels are positioned at the front of the delivery device 104, another two of the six wheels are positioned at the middle of the delivery device 104, and the last two of the six wheels are positioned at the back of the delivery device 104. Note, however, that the delivery device 104 can be equipped with any number of wheels 124 in any particular configuration. In one embodiment, one or more of the wheels 124 may be omni-directional (omni) wheels. As used herein, an omni wheel refers to a wheel with multiple small discs (or rollers) around the circumference of the wheel that are perpendicular to the turning direction. The omni-wheel can enable the delivery device 104 to move in all directions. In some embodiments, one or more of the wheels 124 can be configured with cogs on a (center) hub portion of the wheel and slots (or notches) between the cogs. As described below, the braking system 126 can engage one or more of the wheels 124 in one of the slots between the cogs on the hub portion of the respective wheel, e.g., to stop motion of the delivery device 104.

The delivery device 104 is also equipped with a set of motors 122. In some embodiments, each wheel 124 may be coupled to a different motor 122. In some embodiments, multiple wheels (e.g., two wheels) may be coupled to the same motor 122. The motor 122 can include, for example, an alternating current (AC) motor, direct current (DC) motor, servo motor, gear motor, etc. In one embodiment, each motor 122 is a DC gear motor with a rotatable shaft that drives (e.g., rotates) the wheel(s) 124 coupled to the motor 122 in a particular direction (e.g., forwards or backwards).

The braking system 126 of the delivery device 104 can be activated (or engaged) to stop movement of the delivery device 104. As described in more detail below, the braking system 126 is configured as an emergency braking system that can stop the wheeled motion of the delivery device 104 in the event of an emergency (e.g., hazard) and/or a power failure. For example, when the delivery device 104 is powered on and power is supplied to various components (e.g., motors 122, braking system 126, etc.) of the delivery device 104 (e.g., power to the braking system 126 is greater than or equal to a threshold), the braking system 126 may electrically disengage from one or more wheels 124 of the delivery device 104, allowing the delivery device 104 to move in response to commands. When power to the motors and/or braking system 126 is removed (e.g., power to the braking system 126 is less than a threshold) due to power failure, a power down command from the controller 120, absence of a power up command from the controller 120, etc., the braking system 126 may engage to one or more wheels 124, stopping movement of the delivery device 104. The braking system 126 may stay engaged while the delivery device 104 is in a powered-off state (or unpowered state) (e.g., power to the delivery device 104 and the braking system 126 is below a threshold). For example, the delivery device 104 may be in the powered-off state while parked. As also described in more detail below, the braking system 126 may also provide a manual override mode (or state) that allows for manually moving the delivery device 104, e.g., when the delivery device 104 is in an unpowered state. The components of the braking system 126 are described in more detail in FIG. 2.

The power module 128 provides power to the components (e.g., controller, motor(s), etc.) of the delivery device 104. The power module 128 may be in the form of battery power, solar power, gas power, super capacitor, fuel cell, or a combination thereof. The power module 128 can be recharged at the dispenser 102 using various techniques. The power module 128 can include power regulators, transformers, capacitors, inductors, wiring, etc. In one embodiment, the power module 128 can be controlled by the controller 120 (e.g., via one or more commands) to supply power to components (e.g., braking system 126) of the delivery device 104 or remove power from the components (e.g., braking system 126) of the delivery device 104. The network interface 130 may communicate using a wireless communication protocol (e.g., WiFi, LTE, 5G, etc.).

While traveling to and/or from the delivery destination 108, the delivery device 104 can encounter one or more safety hazards 106 A-K. In one example, the delivery device 104 may encounter a pothole in the sidewalk. In another example, a pedestrian may be in the traveling path of the delivery device 104. In another example, the delivery device 104 may encounter a physical obstruction (e.g., tree branch, door, debris, broken steps, etc.). In another example, the delivery device 104 may (temporarily) lose power, due to a power failure event. In some cases, in response to detecting a hazard, the delivery device 104 may engage (or activate) its braking system 126 in order to stop movement of the delivery device 104. In one embodiment, the delivery device 104 can engage the braking system 126 by putting the braking system 126 in an unpowered state, so that the power to the braking system 126 is less than a threshold. In one embodiment, the braking system 126 stays engaged while power to the braking system 126 is less than the threshold.

Figure 2:
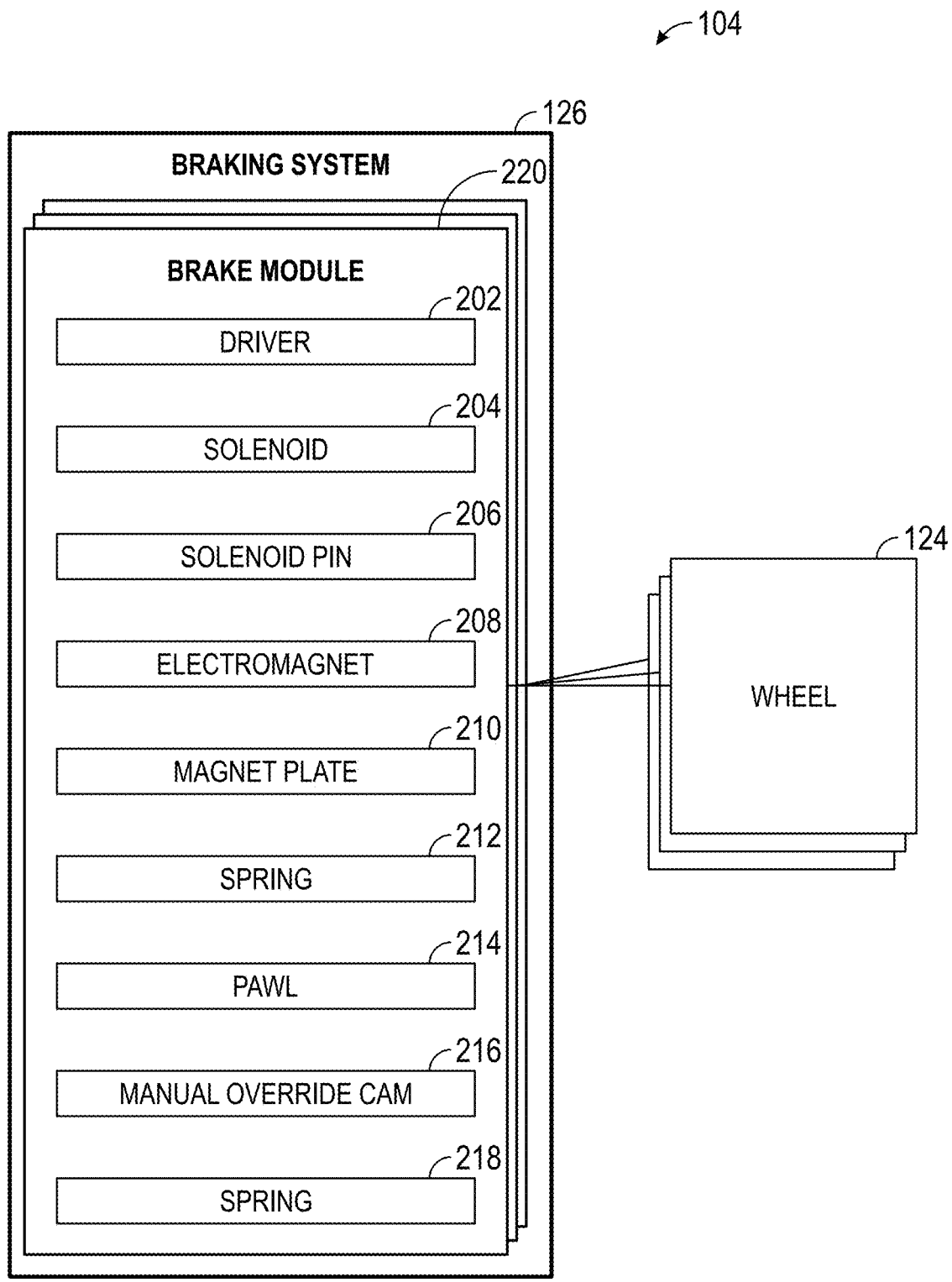
FIG. 2 further illustrates components of the delivery device described relative to FIG. 1, according to one embodiment.

FIG. 2 further illustrates components of the braking system 126 described relative to FIG. 1, according to one embodiment. As shown, the braking system 126 includes one or more brake modules 220, each of which is configured to couple to a different wheel 124 of the set of wheels 124 of the delivery device 104. For example, as described below, each brake module 220 is configured to engage the wheel 124 coupled to the brake module 220 in order to stop the movement (or rotation) of the wheel 124, e.g., when the brake module 220 is unpowered due to a command and/or power failure event.

In one embodiment, the number of brake modules 220 is equal to the number of wheels 124 of the delivery device 104 (e.g., a brake module 220 is included for each wheel 124). In one embodiment, the number of brake modules is less than the number of wheels 124 of the delivery device 104 (e.g., a brake module 220 is included for each of a subset of the wheels 124). In one particular embodiment, the delivery device 104 includes four brake modules 220 and six wheels 124. In this embodiment, the four brake modules 220 may be used for the two front wheels 124 and the two middle wheels 124 of the delivery device 104.

Each brake module 220 includes a driver 202, a solenoid 204, a solenoid pin 206, an electromagnet 208, a magnetic plate 210 (also referred to as a magnet plate or a solenoid plate), a spring 212, a pawl 214, a manual override cam 216, and a spring 218, which are described in more detail below. Each brake module 220 may be configured as an emergency brake that engages with its respective wheel 124 to stop movement (or rotation) of the wheel 124. In some cases, the brake module 220 can engage its wheel 124, based on a command (or absence of a command) from the driver 202. The driver 202, for example, can refrain from powering the brake module 220, when a hazard is encountered, when the delivery device 104 is parked, etc. In other cases, the brake module 220 can engage its wheel 124 due to a power failure event, e.g., which causes power to be cut off to the brake module 220.

In one embodiment, the brake module 220 may engage (or couple) to the wheel 124 via the pawl 214. For example, the wheel 124 may be configured with cogs on a (center) hub portion of the wheel 124 and slots (or notches) between the cogs. The brake module 220 can engage the wheel 124 (via the pawl 214) in one of the slots between the cogs on the hub portion of the wheel 124, e.g., to stop motion of the wheel 124.

In one embodiment, the driver 202 is configured to control when the brake module 220 engages the wheel 124 and disengages from the wheel 124. For example, the driver 202 can trigger the pawl 214 to disengage from the wheel 124 by activating the solenoid 204 and the electromagnet 208. Once the pawl 214 is disengaged from the wheel 124, the driver 202 can deactivate the solenoid 204 while keeping the electromagnet 208 activated to hold (or retain) the pawl 214 disengaged from the wheel 124. The driver 202 can trigger the pawl 214 to engage the wheel 124 by deactivating the electromagnet 208. The driver 202 may control the brake module 220 in response to a command from the controller 120. In one embodiment, a user can manually control when the brake module 220 engages the wheel 124 or disengages the wheel 124 by engaging a lever (not shown in FIG. 2) coupled to the manual override cam 216.

Figure 3A:
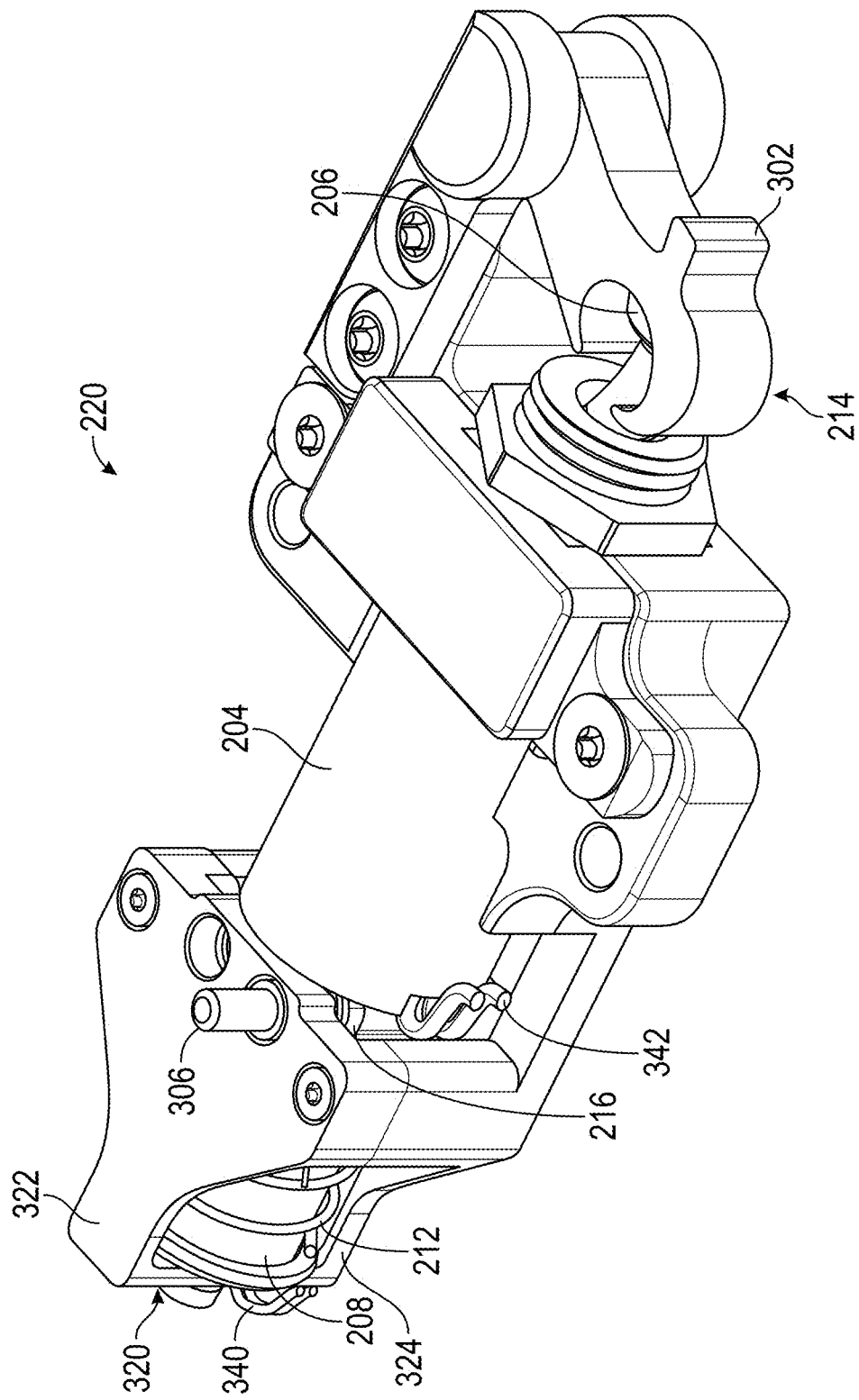
FIG. 3A illustrates a connected view of a brake module of a delivery device, according to one embodiment.
Figure 3B:
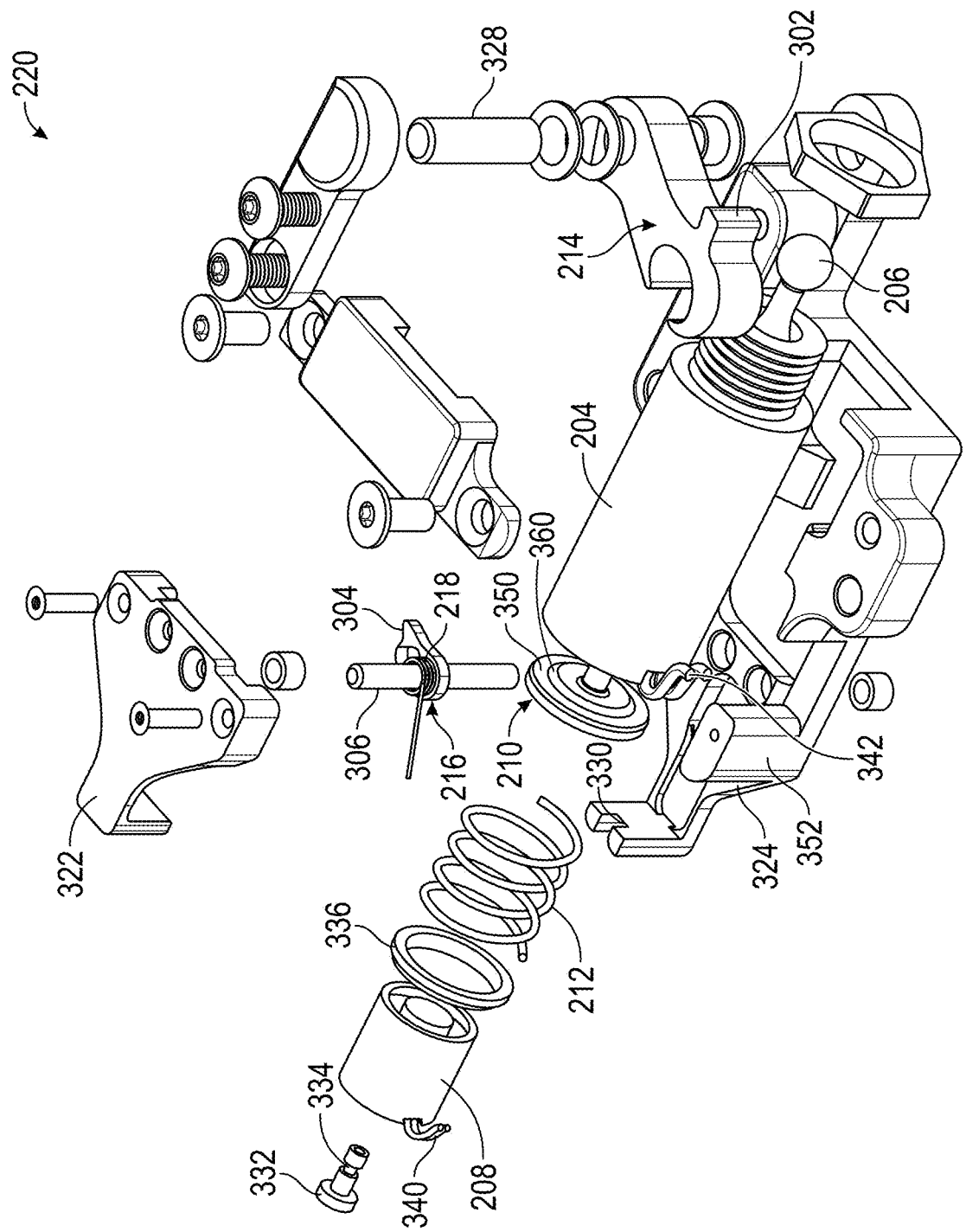
FIG. 3B illustrates an exploded view of a brake module of a delivery device, according to one embodiment.
Figure 3C:
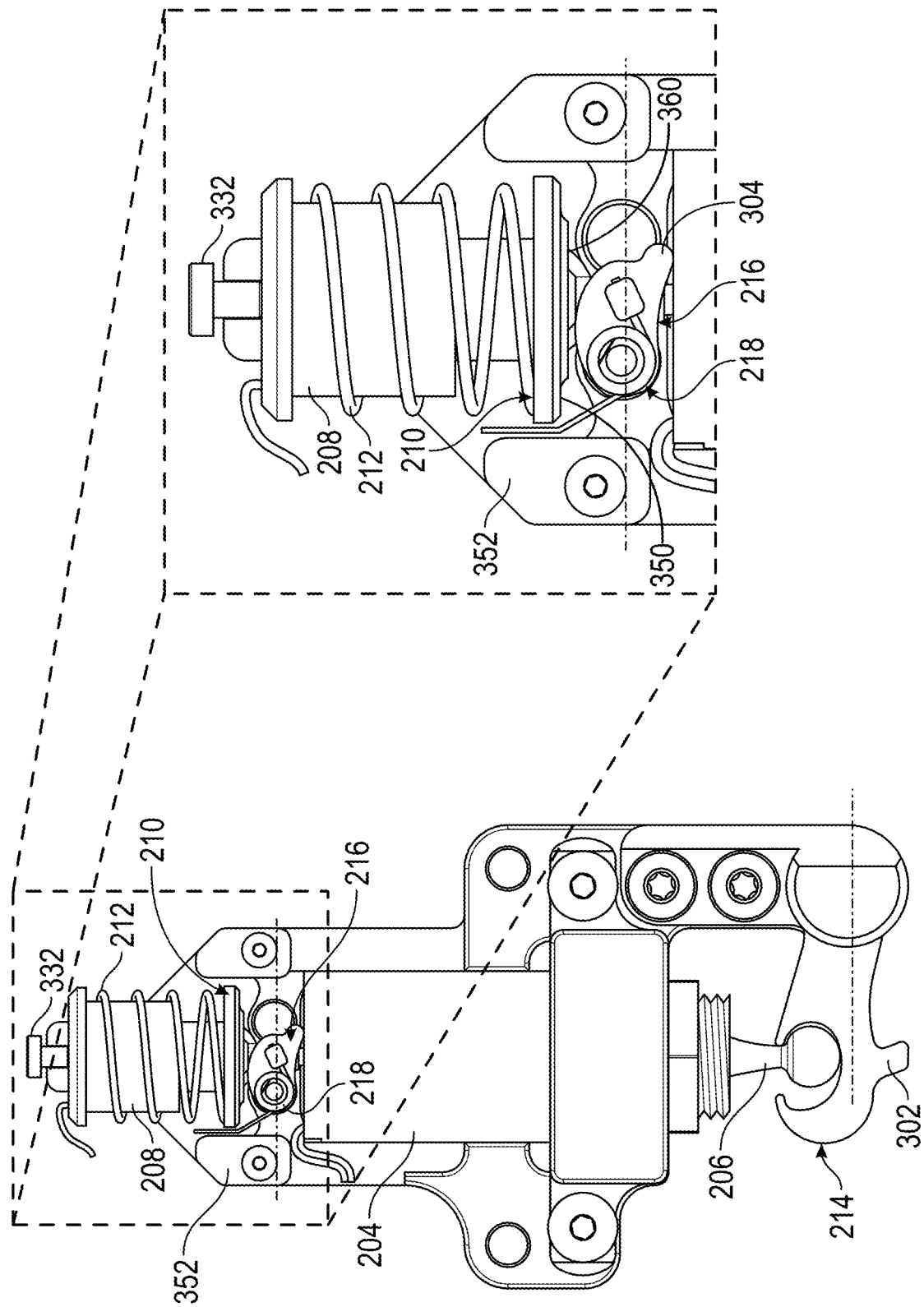
FIG. 3C illustrates a top view of a brake module of a delivery device, according to one embodiment.

FIGS. 3A, 3B, and 3C illustrate an example configuration of the brake module 220, according to one embodiment. In particular, FIG. 3A depicts a connected view of the brake module 220, FIG. 3B depicts an exploded view of the brake module 220, and FIG. 3C depicts a top view of the brake module 220, according to one embodiment. In this configuration, the pawl 214 of the brake module 220 is coupled to a shaft 328 at one end of the pawl 214 and is coupled to the solenoid pin 206 at the other end of the pawl 214. The pawl 214 is configured to pivot around the shaft 328 to engage a wheel 124 or disengage from a wheel 124. For example, the pawl 214 includes a tooth 302 (also referred to as a toothed portion), which is configured to engage a wheel 124 in one of the slots (or notches) between the cogs of the wheel 124 (not shown in FIGS. 3A, 3B, and 3C).

The solenoid pin 206 is at least partially disposed within the solenoid 204. One end of the solenoid pin 206 is coupled to the pawl 214 and another end of the solenoid pin 206 is coupled to the magnetic plate 210. The spring 212 is attached to the magnetic plate 210 at one end of the spring 212 and is attached to the electromagnet 208 at another end of the spring 212 via the spacer 336. The solenoid 204 may be electrically coupled to the driver 202 (not shown) via wires 342. Similarly, the electromagnet 208 may be electrically coupled to the driver 202 (not shown) via wires 340.

The brake module 220 includes a frame 320, which is used to support one or more components of the brake module 220. As shown, the frame 320 includes a support member 322 and a support member 324. The support member 324 provides a bottom support for the solenoid 204 and the electromagnet 208. The support member 322 provides an upper support for the electromagnet 208. As shown, the electromagnet 208 is partially enclosed by the support member 322 and the support member 324. For example, the support member 322 is connected to the support member 324 over the portion of the support member 324 that provides bottom support for the electromagnet 208.

As shown in FIG. 3B, the support member 324 includes a cutout region 330, which is used to provide support for a connector 332 (also referred to as a fastener) (e.g., a threaded screw). The connector 332 is used to attach the electromagnet 208 of the brake module 220 to the support structure (e.g., a brake assembly not shown in FIGS. 3A-3C) for the brake module 220. For example, the connector 332 includes a grooved portion 334, which sits in the cutout region 330 when the support member 322 is attached to the support member 324.

The manual override cam 216 is coupled to a shaft 306 (e.g., a cam shaft) and is positioned between the solenoid 204 and the electromagnet 208. In particular, as shown in FIG. 3C, the manual override cam 216 is positioned over the shaft 306 and between the solenoid 204 and the electromagnet 208. In one embodiment, the shaft 306 is connected to a lever (not shown) that is accessible to a user and that allows the user to rotate the shaft 306. The rotation of the shaft 306 causes the manual override cam 216 to rotate and engage the magnetic plate 210. For example, the manual override cam 216 includes a pivot 304 (also referred to as an elongated portion or cam lobe) that can engage the magnetic plate 210 in a detent region 350 of the magnetic plate 210. As described below, when the manual override cam 216 is engaged, the pivot 304 displaces the magnetic plate 210 towards the electromagnet 208, retracting the solenoid pin 206 and disengaging the pawl 214 from the wheel 124.

The spring 218 is positioned over the shaft 306 and is in contact with the manual override cam 216. In one embodiment, the spring 218 is a torsion spring, which has one end (or leg) attached to a surface of the manual override cam 216 and has another end (or leg) that can be positioned within a gap between the solenoid 204 and a shoulder member 352 of the support member 324 of the frame 320. As described below, the spring 218 can be used to return the manual override cam 216 to a normal operating position (or unused state), in the event power is supplied to the brake module 220 while the manual override cam 216 is still engaged with the magnetic plate 210.

In some embodiments, the configurations (or features) of the magnetic plate 210 and the manual override cam 216 allow a user to manually engage the brake module 220 with a wheel 124 and allow the user to manually disengage the brake module 220 from the wheel 124. In the embodiment depicted in FIGS. 3A-3C, for example, the magnetic plate 210 includes an inner circumference portion 360 (also referred to as a lip segment or step segment) adjacent to the detent region 350. The inner circumference portion 360 is a protruding feature of the magnetic plate 210 (e.g., the inner circumference portion 360 extends outward from the magnetic plate 210, creating a step with respect to the detent region 350). The inner circumference portion 360 is also positioned off-centered with respect to the axis of rotation of the shaft 306.

In these embodiments, the manual override cam 216 can be rotated (via a force applied to a lever coupled to the shaft 306) to a position (e.g., over cam position) where the pivot 304 engages the magnetic plate 210 in the detent portion 350 of the magnetic plate 210. At this position, the point of contact of the pivot 304 may be past a vertical line with the axis of rotation of the shaft 306. Additionally, when the manual override cam 216 is at this over-cam position, the manual override cam 216 can be prevented from returning to its normal operating position by the inner circumference portion 360 of the magnetic plate 210. In one embodiment, the size (e.g., thickness) of the inner circumference portion 360 may control the amount of force that has to be applied to the lever coupled to the shaft 306 to return the manual override cam 216 to the normal operating position. Additionally, the force of the spring 212 acting upon the magnetic plate 210 can also impact the amount of force that has to be applied to the lever coupled to the shaft 306 to return the manual override cam 216 to the normal operating position. For example, as the manual override cam 216 is rotated to the over cam position it displaces the magnetic plate 210 towards the electromagnet 208 and compresses the spring 212 (from its equilibrium position).

Note that FIGS. 3A-3C depict a reference example of a configuration of a brake module 220 and that the configuration of the brake module 220 may be different in other embodiments. For example, while the manual override cam 216 and the magnetic plate 210 are shown as having a particular configuration in FIGS. 3A-3C, the configurations (or features) of the manual override cam 216 and the magnetic plate 210 can be different in other embodiments. For instance, the manual override cam 216 and/or the magnetic plate 210 can have any configuration suitable for (i) allowing the manual override cam 216 to engage the magnetic plate 210 in order to enable a manual override state of the brake module 220 and (ii) allowing the manual override cam 216 to disengage from the magnetic plate 210 in order to disable the manual override state of the brake module 220.

Figure 4A:
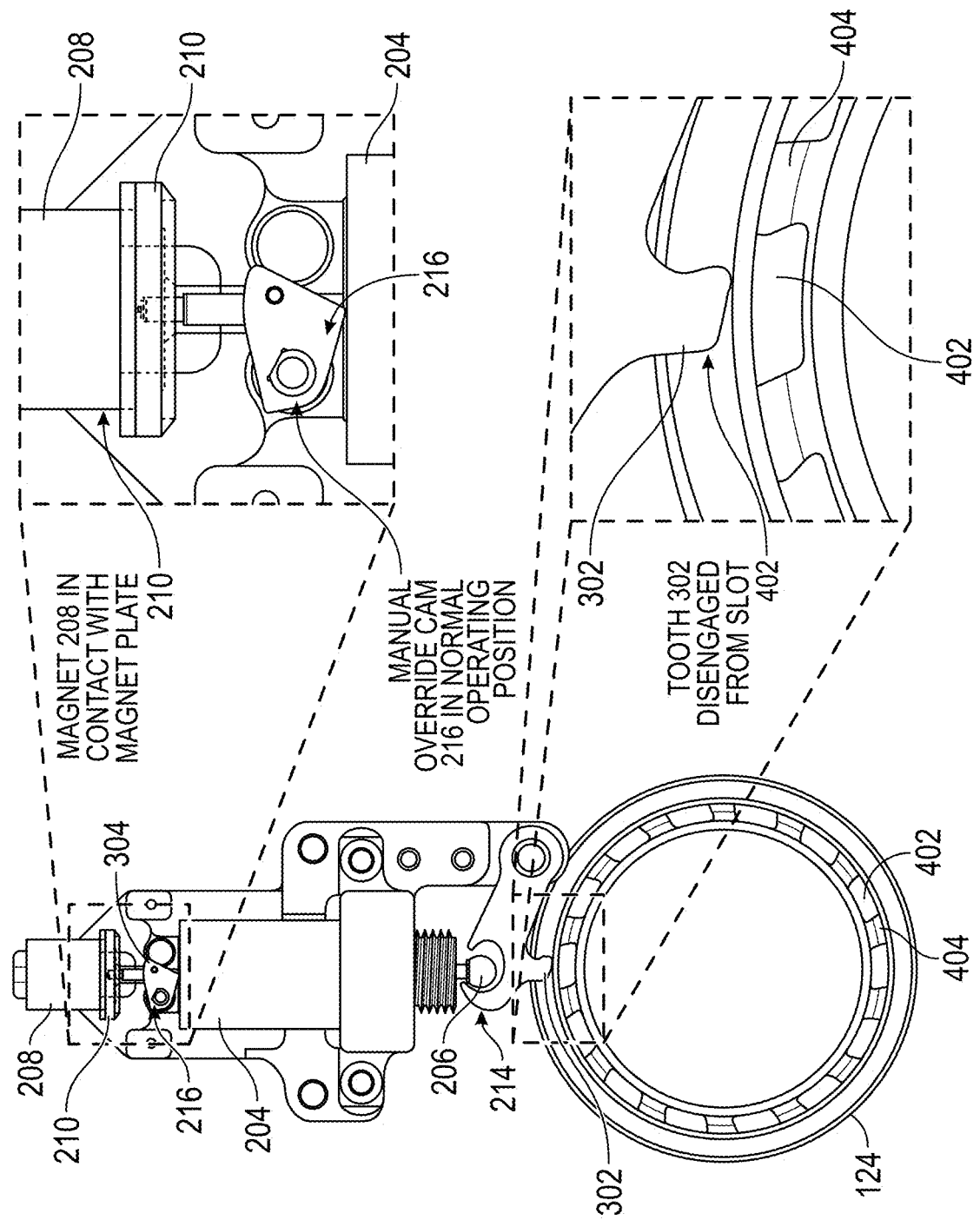
FIG. 4A illustrates an example brake module disengaged from a wheel of a delivery device, according to one embodiment.

FIG. 4A illustrates an example configuration of a brake module 220 disengaged from a wheel 124 of a delivery device 104, according to one embodiment. In this embodiment, the wheel 124 includes a hub portion that has multiple cogs 404 and slots 402 (also referred to as hubs) interposed between the cogs 404. In this embodiment, the manual override cam 216 is in a normal operating position (e.g., the manual override cam 216 is not being used to disengage the brake module 220 from the wheel 124).

In some embodiments, the driver 202 can trigger the pawl 214 to disengage from the wheel 124 by activating the solenoid 204. For example, the solenoid 204 is configured to retract (or pull) the solenoid pin 206 into the solenoid 204, e.g., when a current is applied to the solenoid 204 via the driver 202. As shown in FIG. 4A, when the solenoid pin 206 retracts, it pulls the pawl 214, disengaging the tooth 302 from the slot 402 of the wheel 124.

In some embodiments, the driver 202 can activate the electromagnet 208 to keep the pawl 214 disengaged from the wheel 124. For example, as shown in FIG. 4A, the retraction of the solenoid pin 206 into the solenoid 204 can push the magnetic plate 210 towards the electromagnet 208, such that the electromagnet 208 comes into contact with the magnetic plate 210. The electromagnet 208 is configured to retain (or hold) the magnetic plate 210 (e.g., while a current is applied to the electromagnet 208 via the driver 202), so that the solenoid pin 206 (and the tooth 302) is held in a disengaged (or retracted) position from the wheel 124. In one embodiment, after the magnetic plate 210 comes into contact with the electromagnet 208, the driver 202 may deactivate (e.g., remove power from) the solenoid 204 while keeping the electromagnet 208 activated. Additionally, although not shown in FIG. 4A, the spring 212 may be compressed (from its equilibrium) as the magnetic plate 210 comes into contact with the electromagnet 208. The spring 212 may be held in a compressed state while the electromagnet 208 is activated.

Figure 4B:
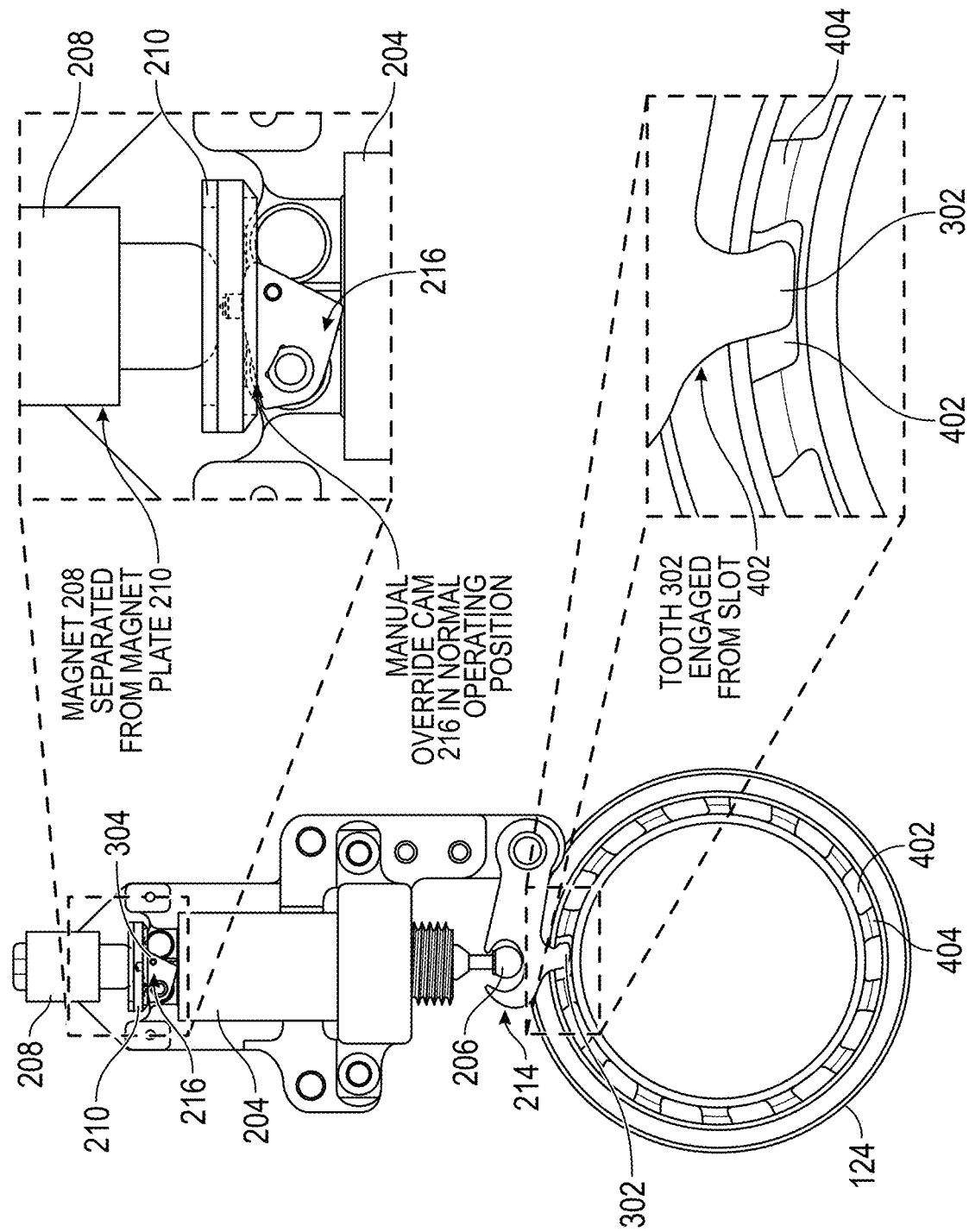
FIG. 4B illustrates an example brake module engaged with a wheel of a delivery device, according to one embodiment.

FIG. 4B illustrates an example configuration of a brake module 220 engaged with a wheel 124 of a delivery device 104, according to one embodiment. In this embodiment, the manual override cam 216 is in a normal operating position.

In some embodiments, the driver 202 can trigger the pawl 214 to engage the wheel 124 by deactivating the electromagnet 208. Here, as noted above with respect to FIG. 4A, the driver 202 may have already deactivated the solenoid 204 (e.g., when the magnetic plate 210 came into contact with the electromagnet 208). The deactivation of the electromagnet 208 can occur in cases of a command from the controller 120 (e.g., in response to detecting a hazard 106, in response to the delivery device 104 being parked, etc.) and/or in cases of a power failure (e.g., when the delivery device 104 and/or the brake module 220 loses power). When the electromagnet 208 is deactivated (e.g., due to a command or power failure), the electromagnet 208 stops retaining the magnetic plate 210. This in turn causes the spring 212 (which is in a compressed state) to push the magnetic plate 210 towards the solenoid 204, forcing the solenoid pin 206 back through the solenoid 204 so that the tooth 302 of the pawl 214 can engage a slot 402 of the wheel 124 (e.g., as shown in FIG. 4B). Note, for the sake of clarity, the spring 212 is not shown in FIG. 4B.

Figure 4C:
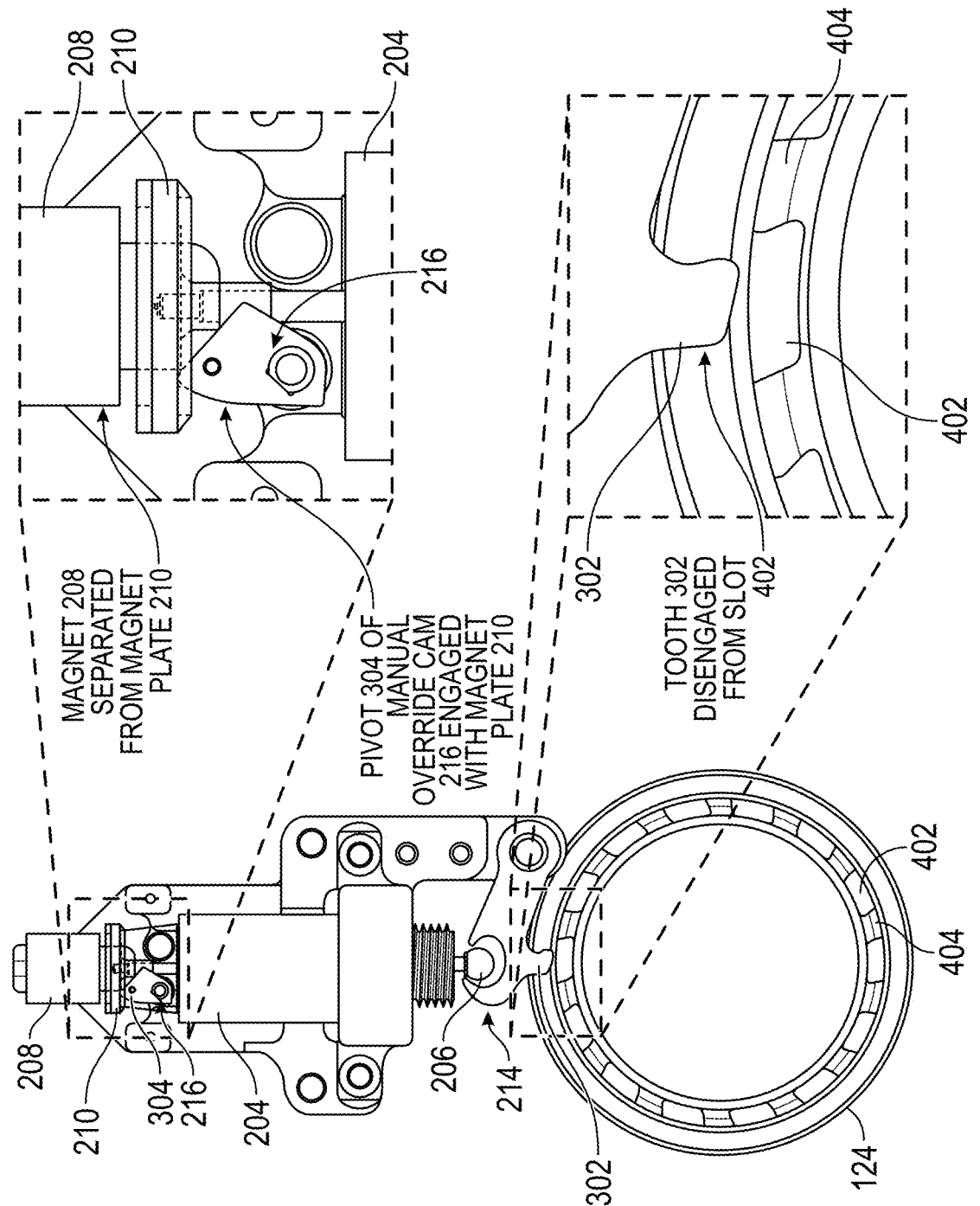
FIG. 4C illustrates another example brake module disengaged from a wheel of a delivery device, according to one embodiment.

FIG. 4C illustrates another example configuration of a brake module 220 disengaged from a wheel 124 of a delivery device 104, according to one embodiment. In this embodiment, the manual override cam 216 can be manually rotated (e.g., by a user applying a force to a lever coupled to the shaft 306 attached to the manual override cam 216) to enable a manual override state of the brake module 220. When the manual override cam 216 is rotated to an over cam position, it causes the pawl 214 to disengage from the wheel 124.

More specifically, the manual override cam 216 can be rotated, via the shaft 306, such that the pivot 304 engages the magnetic plate 210. In one embodiment, the pivot 304 may engage the magnetic plate 210 in a detent region 350 of the magnetic plate 210. When the manual override cam 216 is engaged with the magnetic plate 210, the magnetic plate 210 may move (or be displaced) towards the electromagnet 208, retracting the solenoid pin 206 through the solenoid 204 and disengaging the tooth 302 of the pawl 214 from a slot 402 of the wheel 124. In this embodiment, although the magnetic plate 210 may be displaced towards the electromagnet 208 when the manual override cam 216 is engaged with the magnetic plate 210, the magnetic plate 210 may still be separated from the electromagnet 208. As described below, this separation between the magnetic plate 210 and the electromagnet 208 (when the manual override state is enabled) may allow for electrically disabling the manual override state in the event power is supplied to the brake module 220 while the manual override state is enabled.

Note that the configuration of the manual override cam 216 and the configuration of the magnetic plate 210 depicted in FIGS. 4A-4C are different than the configuration of the manual override cam 216 and the configuration of the magnetic plate 210 depicted in FIGS. 3A-3C, respectively. In FIG. 4C, for example, the manual override cam 216 has a different shaped pivot 304 than the pivot 304 depicted in FIGS. 3A-3C. Similarly, the magnetic plate 210 in FIG. 4C has a different configuration of the detent region 350 compared to the detent region 350 of the magnetic plate 210 in FIGS. 3A-3C. Here, in particular, the detent region 350 is configured as a groove or a trench (within the magnetic plate 210) which is where the pivot 304 engages the magnetic plate 210.

As noted, the braking system 126 of the delivery device 104 is generally configured to be engaged when the braking system 126 is unpowered (e.g., due to the delivery device 104 being powered off, due to a command received from the controller 120, etc.). This braking system configuration can ensure that the delivery device 104 does not move when it is not in use (e.g., the delivery device 104 may be parked). In some scenarios, however, a user may want to move the delivery device 104 while it is powered off (e.g., the user may be performing maintenance on the delivery device, the user may be testing the delivery device, manually transporting the delivery device to a location, etc.). In these scenarios, the user can put the braking system 126 in a manual override state (also referred to as a manual released mode), which disengages the brake modules 220 and allows the user to manually move the delivery device when the braking system 126 is unpowered.

Figure 5A:
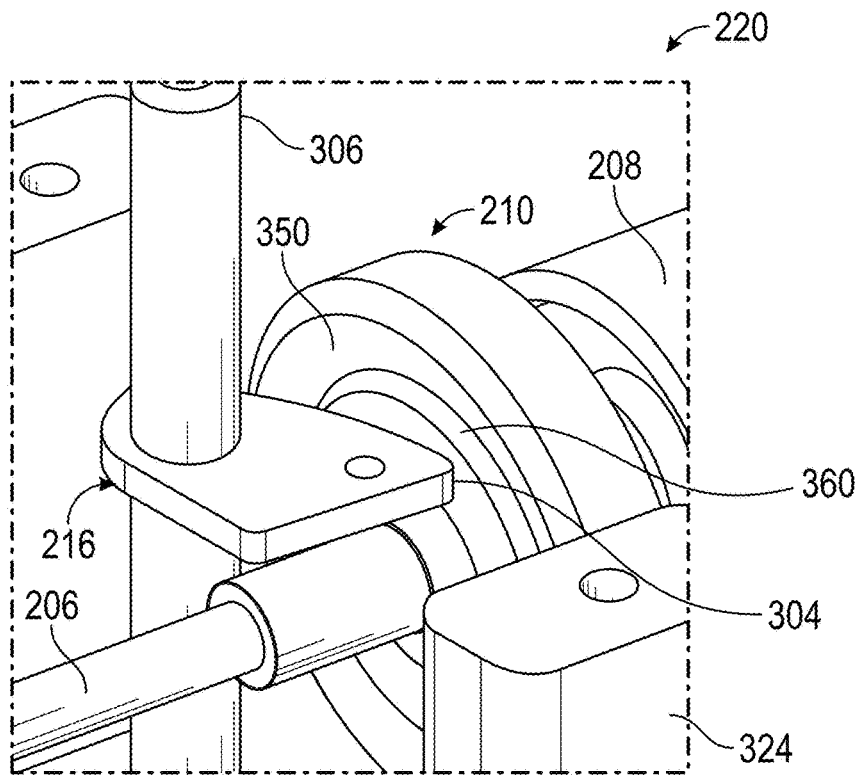
FIGS. 5A-5C illustrate an example sequence for enabling a manual override state of a brake module, according to one embodiment.
Figure 5B:
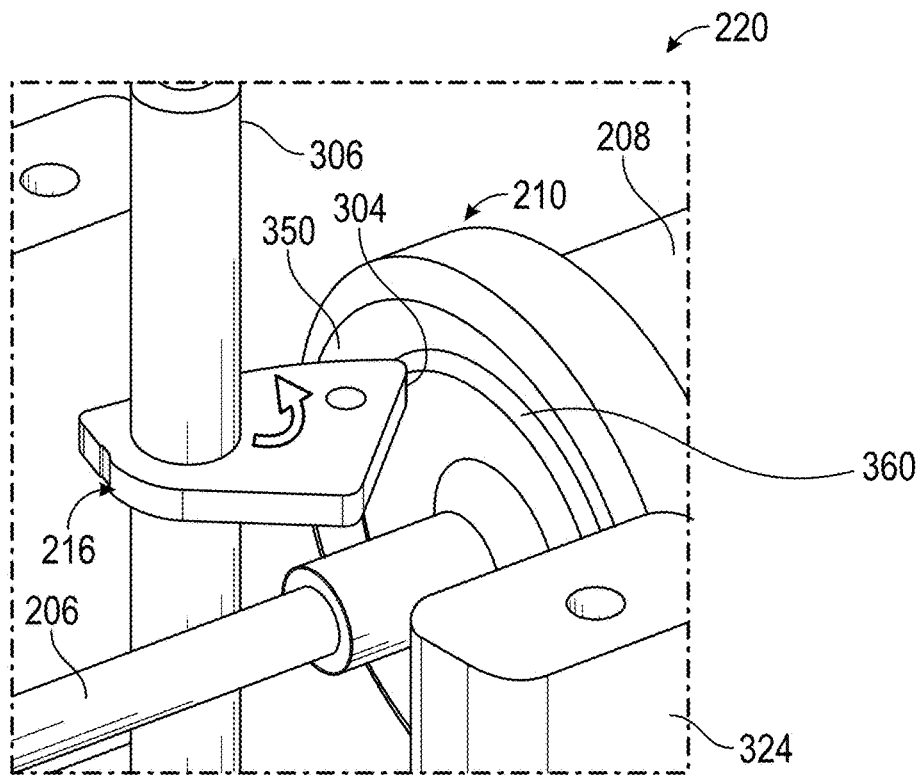
Figure 5C:
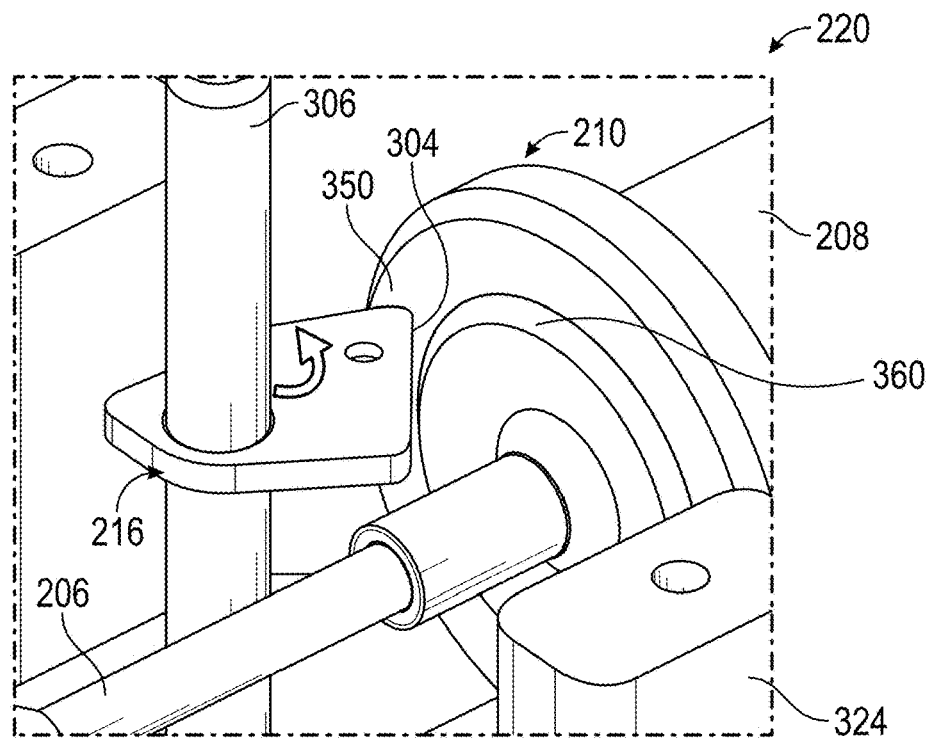

FIGS. 5A-5C illustrate an example sequence for enabling a manual override state of a brake module 220, according to one embodiment. As shown in FIG. 5A, the manual override cam 216 may initially be in a normal operating position. Here, the brake module 220 may be unpowered and the brake module may be engaged with a wheel 124 (e.g., similar to the configuration shown in FIG. 4B). When the manual override cam 216 is in the normal operating position, the manual override state is disabled. For example, when the manual override cam 216 is in the normal operating position, the pivot 304 of the manual override cam 216 is not in a position to displace the magnetic plate 210.

As shown in FIG. 5B, at a subsequent point in time, the manual override cam 216 is rotated (e.g., in the direction of the arrow) causing the brake module 220 to disengage from the wheel 124. As noted above, the manual override cam 216 can be rotated via a force applied to a lever (not shown), which is coupled to the shaft 306, which is attached to the manual override cam 216. In FIG. 5B, the manual operating cam 216 is rotated to a position where it contacts (or engages) the inner circumference portion 360 of the magnetic plate 210. The displacement of the magnetic plate 210 towards the electromagnet 208 via the manual operating cam 216 may be at its maximum when the manual operating cam 216 is at this position.

As shown in FIG. 5C, at a subsequent point in time, the manual operating cam 216 is further rotated (e.g., by a user via the shaft 306) to a position (e.g., over cam position) where the pivot 304 of the manual operating cam 216 is seated in the detent region 350 to keep the brake module 220 disengaged from the wheel 124. Here, the brake module 220 may be unpowered and the brake module may be disengaged from the wheel 124 (e.g., similar to the configuration shown in FIG. 4C). As noted above, when the manual operating cam 216 is rotated to this position shown in FIG. 5C, the force of the spring 212 (not shown) which is compressed and/or the size (e.g. thickness) of the inner circumference portion 360 of the magnetic plate 210 may act to keep the manual operating cam 216 seated in the detent region 350

(and, in turn, keep the brake module 220 disengaged from the wheel 124). This configuration of the manual operating cam 216 and the magnetic plate 210 can prevent (or reduce the likelihood of) the manual operating cam 216 inadvertently rotating back to the normal operating position, e.g., in the event the delivery device 104 hits a bump or other physical obstruction.

Note, although not shown in FIGS. 5A-5C, the rotation of the manual override cam 216 from a normal operating position (e.g., shown in FIG. 5A) to an over cam position (e.g., shown in FIG. 5C) can pre-load a spring 218 (e.g., torsion spring). As described below, this torsion spring can be used to aid the return of the manual override cam 216 from its over cam position to its normal operating position.

In some embodiments, the manual override state of the brake module 220 can be manually disabled by the user in order to manually (re)-engage the brake module 220 with a wheel 124 of the delivery device 104. To manually disable the manual override state of the brake module 220, the user can apply a force to the lever, which is coupled to the shaft 306, which is attached to the manual override cam 216. When a sufficient force is applied to the lever, this can cause the manual override cam 216 to rotate (in an opposite direction) back to its normal operating position, such that the brake module 220 engages the wheel 124. For example, when the manual override cam 216 is in the normal operating position, the pivot 304 of the manual override cam 216 is not in a position to displace the magnetic plate 210. The amount of force that the user has to apply to the lever to manually disable the manual override state may be based on at least one of the position of the magnetic plate 210 relative to the manual operating cam 216, the size (e.g., thickness) of the inner circumference portion 360 of the magnetic plate 210, and/or the amount of force of the (compressed) spring 212 acting on the magnetic plate 210 when the manual operating cam 216 is in the over cam position.

In some cases, the delivery device 104 may be powered on while the manual override state is enabled on one or more of the brake modules 220. For example, a user may have enabled the manual override state (e.g., by engaging a lever coupled to the manual override cam 216) and may not have disabled the manual override state (e.g., by disengaging the lever coupled to the manual override cam 216). In scenarios where the delivery device 104 is powered on while the manual override state is enabled on one or more of the brake modules 220, the delivery device 104 can be inadvertently operated without the ability to engage these brake module(s) 220. This, in turn, can create unsafe operating conditions.

To address this, embodiments provide an automatic manual override return mechanism that can disable the manual override state of a brake module(s) 220, in the event the delivery device 104 is powered on while the manual override state for the brake module(s) 220 is enabled. For example, when the manual override state of a brake module 220 is enabled, the manual override cam 216 is engaged with the magnet plate 210 (e.g., as shown in FIG. 5C). This position of the manual override cam 216 disengages the pawl 214 from the wheel 134 (e.g., as shown in FIG. 4C).

If the brake module 220 is then powered on while the manual override state is enabled, embodiments can electrically disable the manual override state and electrically disengage the brake module(s) 220. For example, in embodiments described herein, powering on the brake module 220 (while the manual override state is enabled) activates the solenoid 204 and the electromagnet 208. When the solenoid 204 is activated, it retracts the solenoid pin 206 further into the solenoid 204, pushing the magnetic plate 210 into contact with the electromagnet 208. Because the magnetic plate 210 is still separated from the electromagnet 208 when the manual override state is enabled (e.g., as shown in FIG. 4C), the remaining displacement of the magnetic plate 210 towards the electromagnet 208 is sufficient to dislodge the pivot 304 of the manual override cam 216 from the detent region 350 of the magnetic plate 210. Once the manual override cam 216 is disengaged, the pre-loaded spring 218 returns the manual override cam 216 to its normal operating position, while the electromagnet 208 (which is activated via the driver 202) retains the pawl 214 in a disengaged position from the wheel 124. At this point, the brake module may be powered, the manual override state may be disabled, and the brake module may be disengaged (e.g., similar to the configuration shown in FIG. 4A). In this manner, the manual override state of a brake module 220 can be electrically disabled and the brake module 220 can be electrically disengaged in the event power is supplied to the brake module 220 (e.g., greater than a threshold power) when the manual override state is enabled on the brake module 220.

Figure 5D:
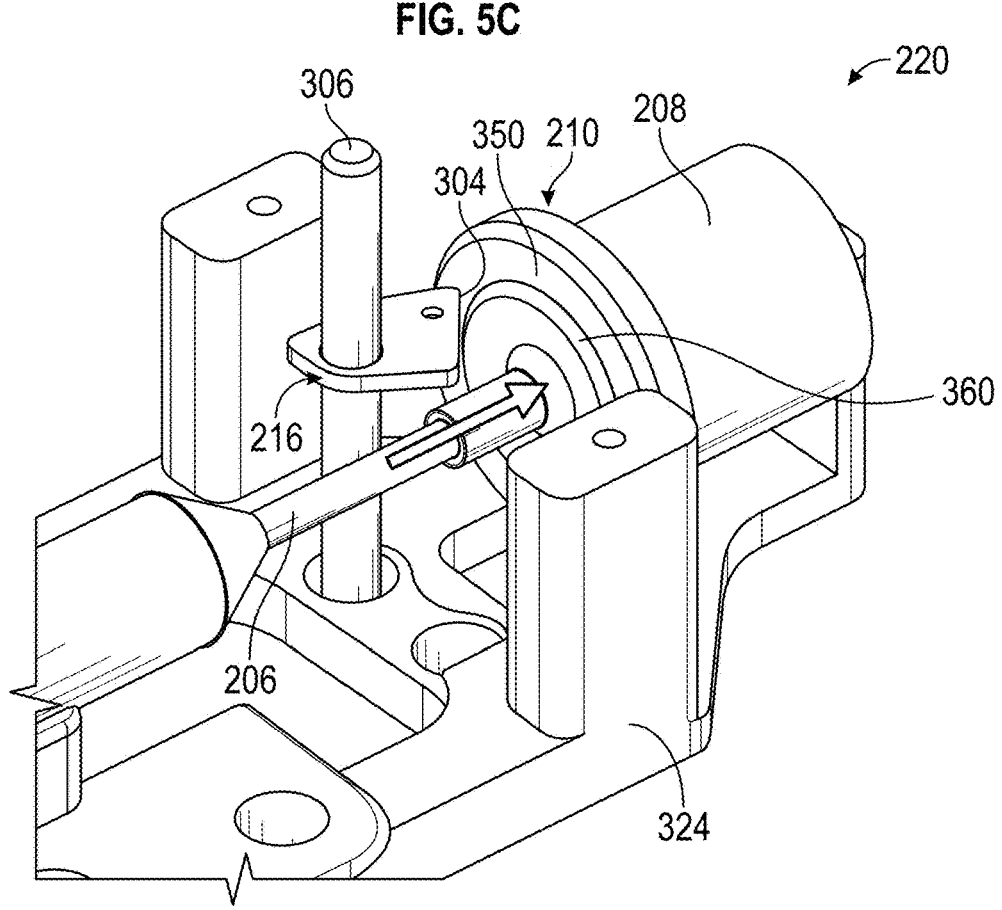
FIGS. 5D-5E illustrate an example sequence for disabling a manual override state of a brake module, according to one embodiment.
Figure 5E:
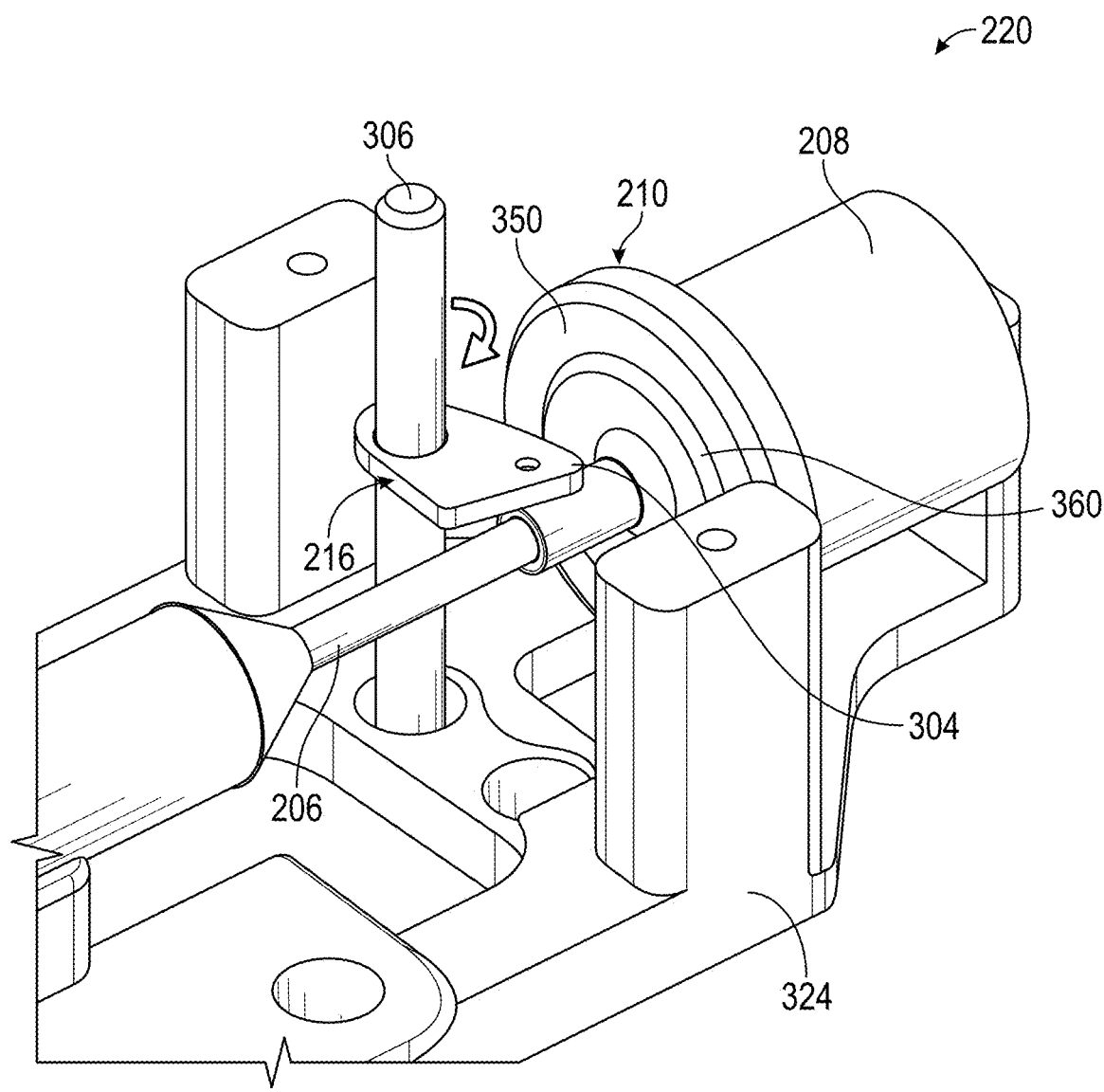

FIGS. 5D-5E illustrate an example sequence for disabling a manual override state of a brake module 220, according to one embodiment. As shown in FIG. 5D, at a subsequent point in time after the manual override cam 216 is engaged with the magnetic plate 210 (e.g., as shown in FIG. 5C), the brake module 220 is powered on, activating the solenoid 204. Once activated, the solenoid 204 retracts the solenoid pin 206 further into the solenoid 204, pushing the magnetic plate 210 into contact with the electromagnet 208.

As shown in FIG. 5E, this displacement of the magnetic plate 210 (e.g., towards the electromagnet 208) disengages the pivot 304 of the manual override cam 216 from the detent region 350 of the magnetic plate 210. Once disengaged, the pre-loaded spring 218 returns the manual override cam 216 to its normal operating position, while the electromagnet 208 (which is activated) retains the pawl 214 in a disengaged position from the wheel 124 (e.g., by holding the magnetic plate 210 in contact with the electromagnet 208).

Figure 6A:
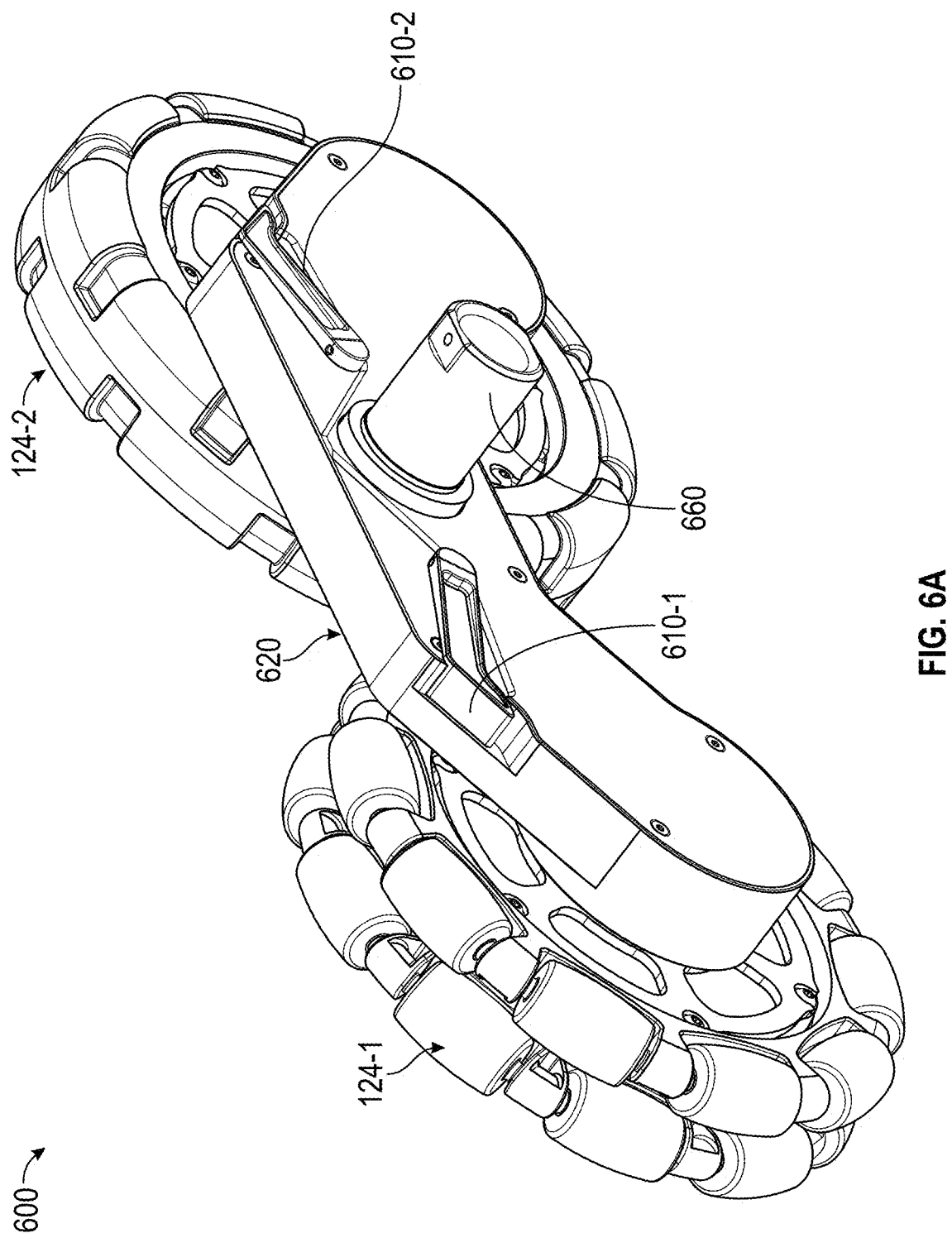
FIG. 6A illustrates a perspective view of a brake assembly for a delivery device, according to one embodiment.
Figure 6B:
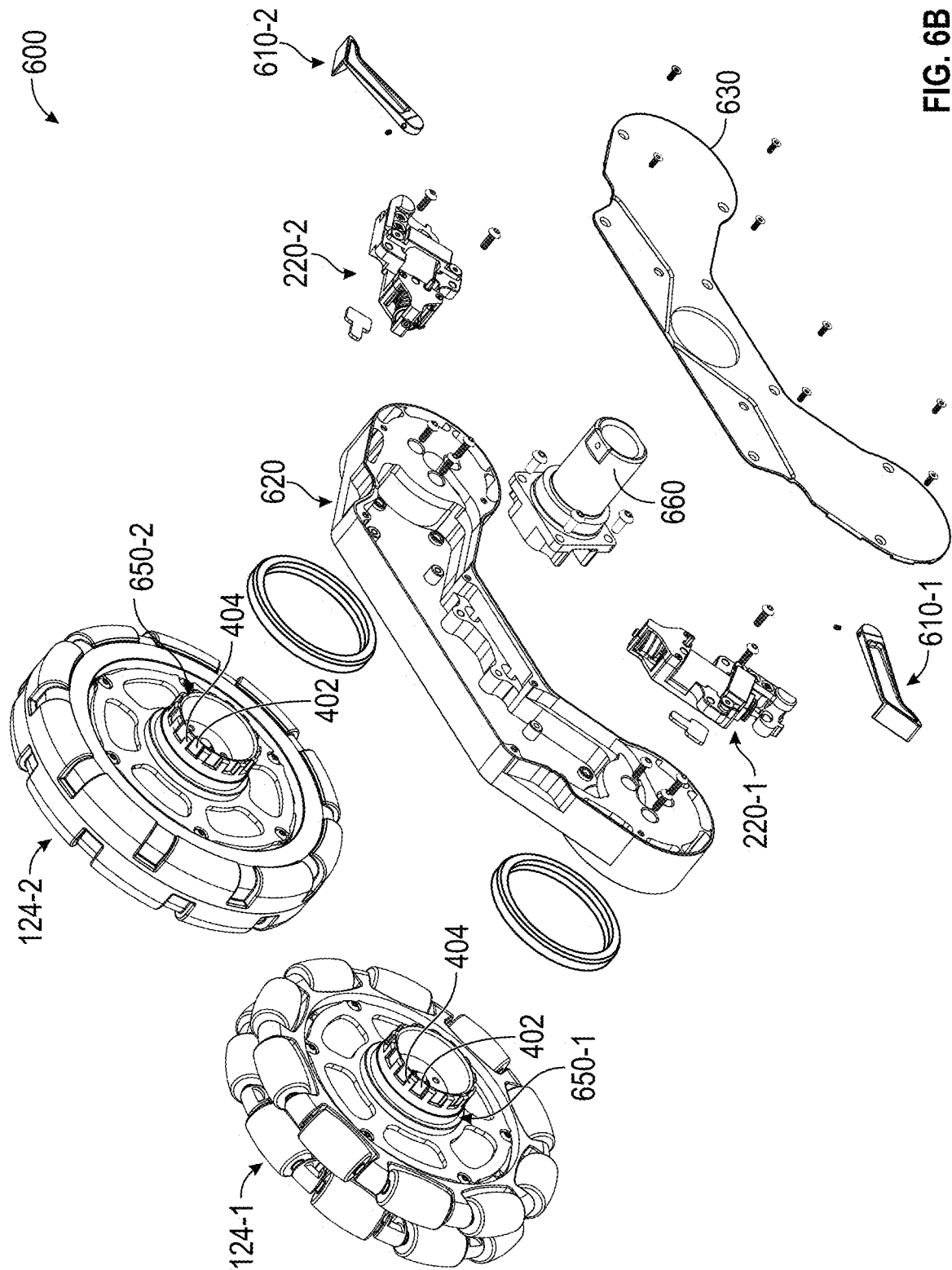
FIG. 6B illustrates an exploded view of a brake assembly for a delivery device, according to one embodiment.
Figure 6C:
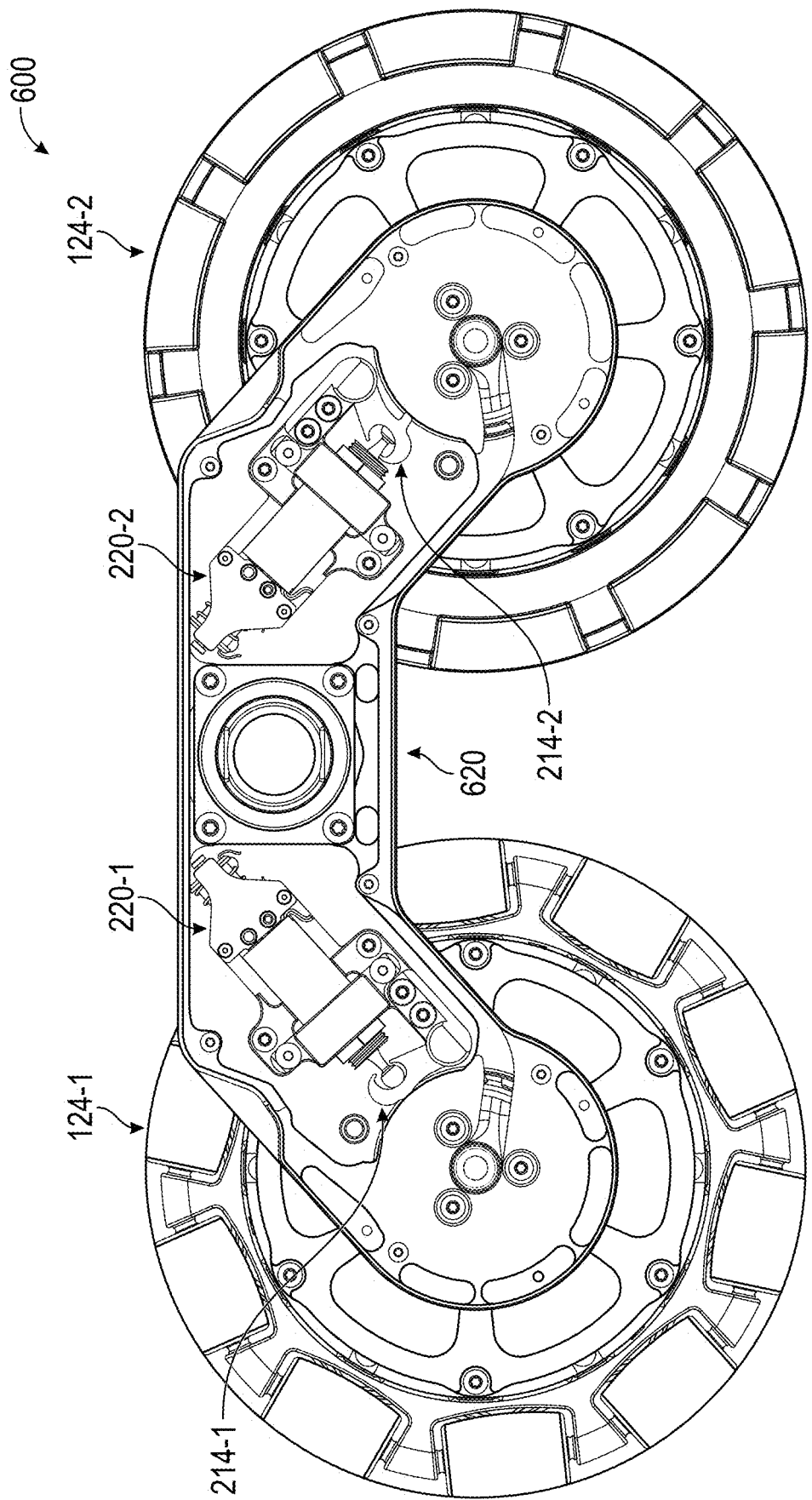
FIG. 6C illustrates a side view of a brake assembly for a delivery device, according to one embodiment.

FIGS. 6A-6D illustrate different views of an example brake assembly 600 (also referred to as a bogie assembly) for a delivery device (e.g., delivery device 104), according to one embodiment. In particular, FIG. 6A illustrates a perspective view of the brake assembly 600, FIG. 6B illustrates an exploded view of the brake assembly 600, FIG. 6C illustrates a cross-sectional side view of the brake assembly 600, and FIG. 6D illustrates a perspective view of the brake assembly 600. In one embodiment, the delivery device includes two brake assemblies 600, one for each side of the delivery device. In this embodiment, a first brake assembly can be used for the front wheel and the middle wheel on a first side of the delivery device; and a second brake assembly can be used for the front wheel and the middle wheel on a second side of the delivery device. The remaining wheels (e.g., back two wheels) of the delivery device may not be configured to engage with a brake module 220.

As shown, the brake assembly 600 includes a housing 620, which can house one or more brake modules 220. For example, the brake assembly 600 includes brake module 220-1, which is configured to engage wheel 124-1, and includes brake module 220-2, which is configured to engage wheel 124-2. The cover 630 can enclose the brake assemblies 220-1 and 220-2 within the housing 620.

Each wheel 124 includes a hub portion 650, which includes one or more slots 402 interposed between cogs 404. The brake module 220-1 is configured to engage the wheel 124-1 in one of the slots 402 of the hub portion 650-1. Similarly, the brake module 220-2 is configured to engage the wheel 124-2 in one of the slots 402 of the hub portion 650-2. The wires and cabling for the brake modules 220-1 and 220-2 can be routed through the post 660.

As shown in FIGS. 6A and 6D, the brake assembly 600 also includes levers 610-1 and 610-2, which allow a user to manually enable and/or disable a manual override state for brake modules 220-1 and 220-2, respectively. For example, one end of the lever 610-1 (e.g., the end proximal to the post 660) can be coupled to a shaft 306 in brake module 220-1 and can rotate the manual override cam 216 in the brake module 220-1. Similarly, one end of the lever 610-2 (e.g., the end proximal to the post 660) can be coupled to a shaft 306 in brake module 220-2 and can rotate the manual override cam 216 in the brake module 220-2. As shown in this embodiment, the levers 610-1 and 610-2 are housed in recessed areas on the outer surface of the housing 620.

To manually enable the manual override state for a brake module 220, the user can pull up on the respective lever 610 for the brake module 220 to put the lever 610 in an engaged position. FIG. 6D shows a reference example where the lever 610-1 is in a disengaged position (e.g., down position), so that the manual override for brake module 220-1 is disabled, and the lever 610-2 is in an engaged position (e.g., up position), so that manual override for brake module 220-2 is enabled. In the embodiment shown in FIG. 6D, the user can lift the lever 610-2 up to about 90 degrees in order to put the lever 610-2 in the engaged position. In one embodiment, the brake module 220-1 may be engaged or disengaged when the lever 610-1 is in the disengaged position. In one embodiment, the brake module 220-2 may be disengaged when the lever 610-2 is in the engaged position.

Figure 7:
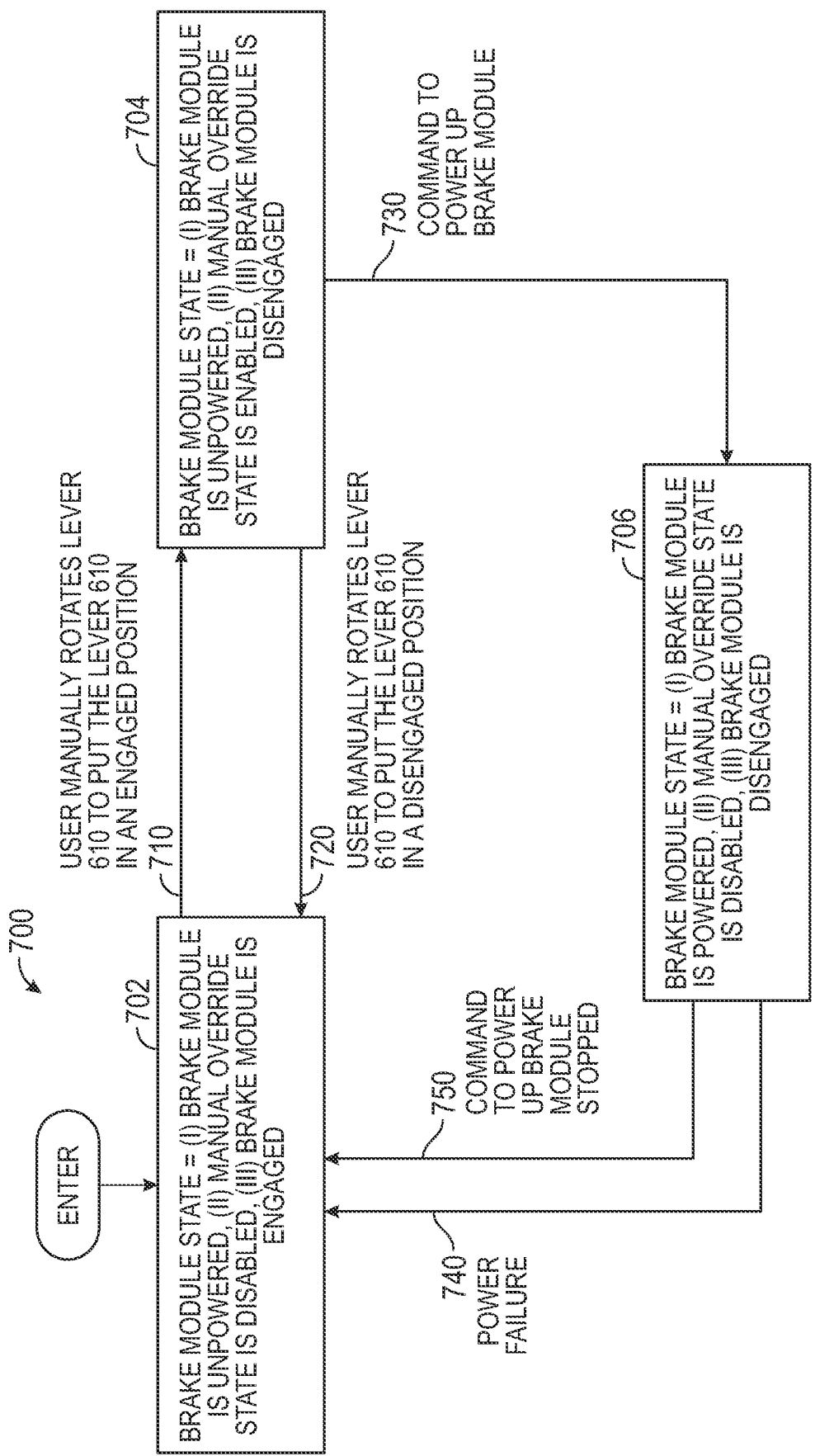
FIG. 7 is a process-state diagram for operating a brake module, according to one embodiment.
Figure 8A:
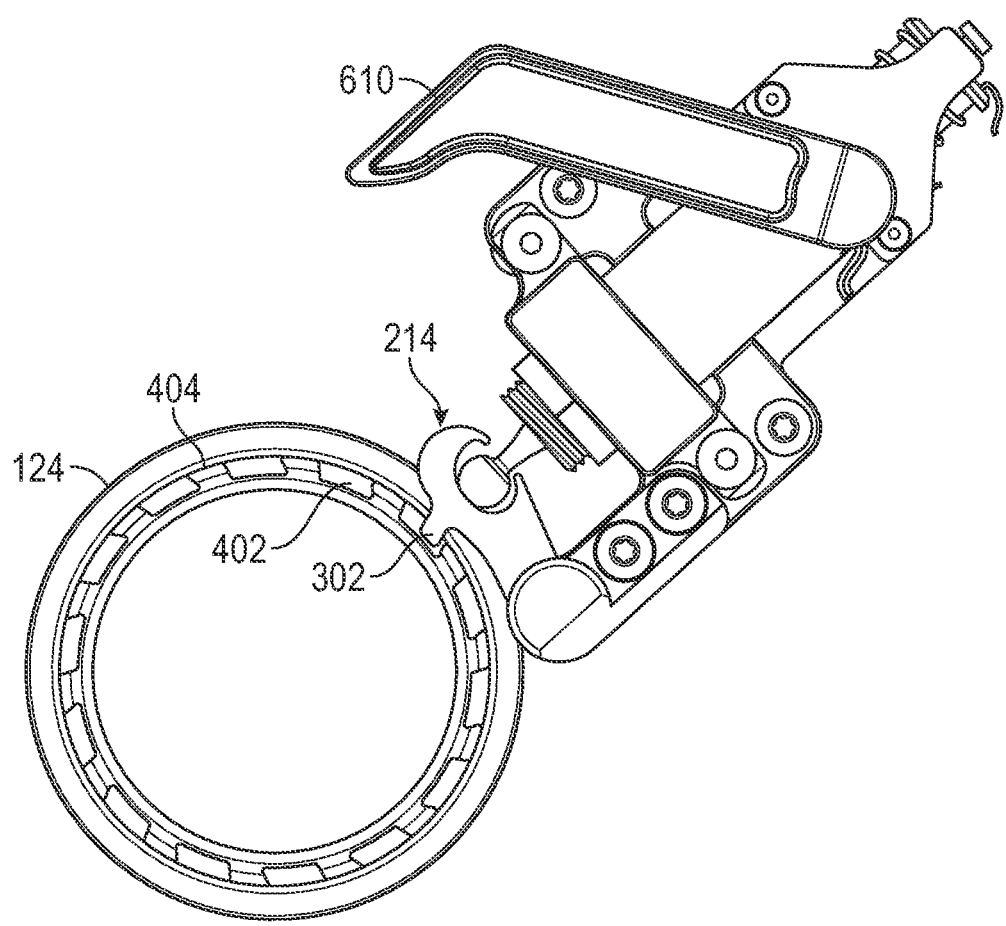
FIG. 8A illustrates a perspective view of a brake module coupled to a lever, according to one embodiment.

FIG. 7 is a process-state diagram 700 for operating a brake module (e.g., brake module 220), according to one embodiment. In one embodiment, the brake module may have an initial brake module state 702, where (i) the brake module is unpowered, (ii) manual override state is disabled, and (iii) the brake module is engaged. FIG. 4B shows one example configuration of the brake module when the brake module is in the brake module state 702. In this brake module state 702, when the manual override state is disabled, the lever 610 may be in a disengaged position (e.g., as shown in FIG. 8A).

Figure 8B:
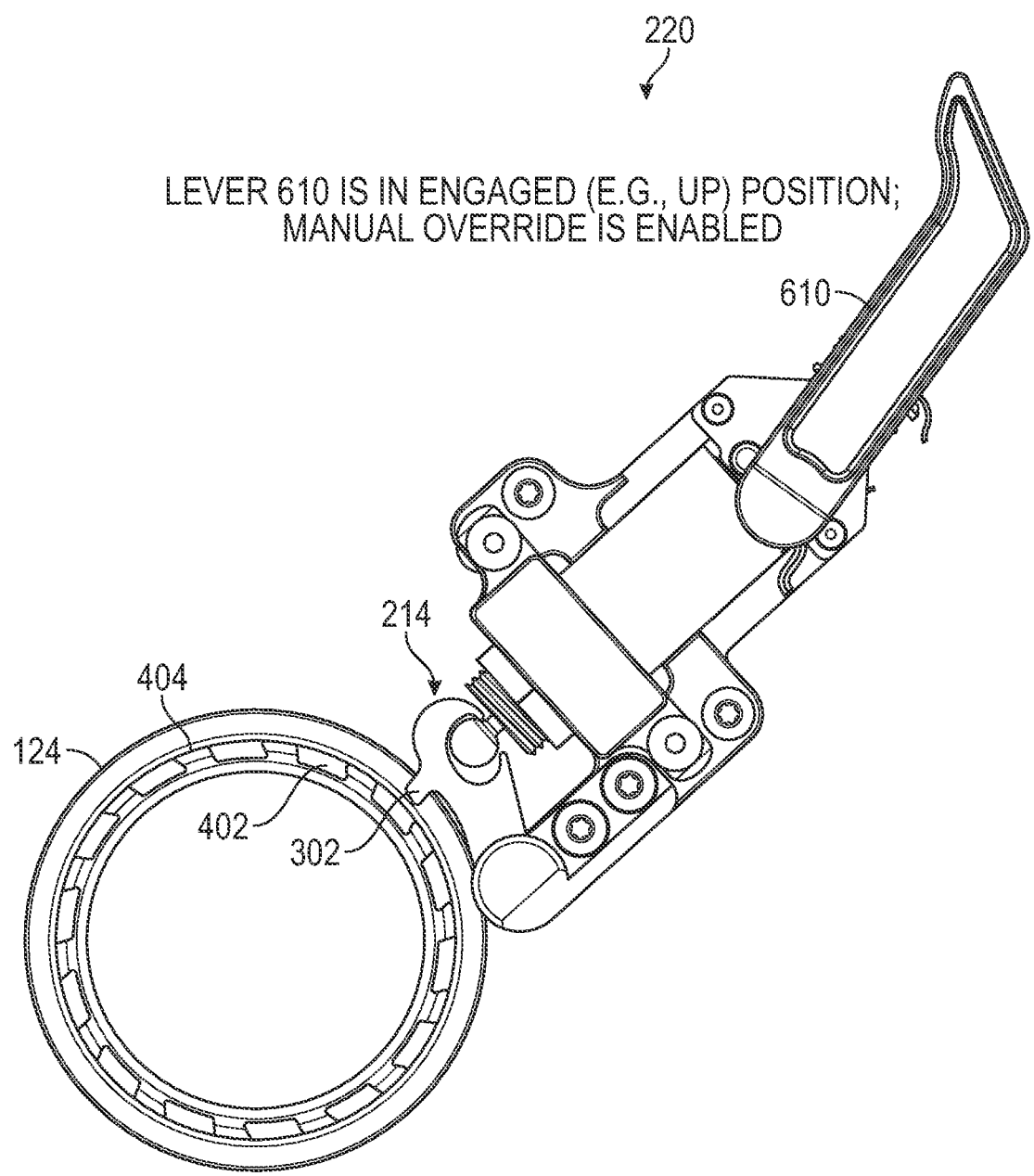
FIG. 8B illustrates another perspective view of a brake module coupled to a lever, according to one embodiment.

If the user manually rotates the lever 610 to put the lever 610 in an engaged position (710) while the brake module is in the brake module state 702, then the brake module transitions from the brake module state 702 to the brake module state 704, where (i) the brake module is unpowered, (ii) manual override state is enabled, and (iii) the brake module is disengaged. FIG. 4C shows one example configuration of the brake module when the brake module is in the brake module state 704. In this brake module state 704, when the manual override state is enabled, the lever 610 may be in an engaged position (e.g., as shown in FIG. 8B). For example, the transition of the brake module from brake module state 702 to brake module state 704 may be similar to the sequence illustrated in FIGS. 5A-5C.

If the user manually rotates the lever 610 to put the lever 610 in a disengaged position while the brake module is in the brake module state 704 (720), then the brake module transitions from the brake module state 704 to the brake module state 702.

If a command is received to power up the brake module while the brake module is in the brake module state 704 (730), then the brake module transitions from the brake module state 704 to the brake module state 706, where (i) the brake module is powered, (ii) manual override state is disabled, and (iii) the brake module is disengaged. FIG. 4A shows one example configuration of the brake module when the brake module is in the brake module state 706. In this brake module state 706, when the manual override state is disabled, the lever 610 may be in a disengaged position (e.g., as shown in FIG. 8A). For example, the transition of the brake module from brake module state 704 to brake module state 706 may be similar to the sequence illustrated in FIGS. 5D-5E.

If the brake module encounters a power failure (740) or the command to power up the brake module is stopped (or a command to power down the brake module is received) (750) while the brake module is in the brake module state 706, then the brake module transitions from the brake module state 706 to the brake module state 702.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An autonomous delivery robot, comprising:
  a plurality of wheels;
  a plurality of motors, each of the plurality of motors being configured to rotate a different one of the plurality of wheels; and
  a braking system comprising one or more brake modules, each brake module being configured to engage a different wheel of the plurality of wheels to stop movement of the wheel when power to the brake module is less than a threshold, wherein:
  each brake module comprises:
    an electromagnet;
    a magnetic plate;
    a pawl configured to engage the wheel to stop movement of the wheel;

a solenoid comprising a solenoid pin, the solenoid pin having a first end coupled to the magnetic plate and having a second end coupled to the pawl; and a manual override mechanism, which when enabled by a user, is configured to allow movement of the wheel when the power to the brake module is less than the threshold, wherein the manual override mechanism comprises a cam disposed between the solenoid and the magnetic plate, wherein the cam is configured to disengage the pawl from the wheel when the cam is rotated by the user from a first position between the solenoid and the magnetic plate to a second position between the solenoid and the magnetic plate; and each brake module is configured to disable the manual override mechanism by returning the cam from the second position to the first position, when the power to the brake module is greater than or equal to the threshold.

2. The autonomous delivery robot of claim 1, wherein when the power to the brake module is greater than or equal to the threshold:
the solenoid is configured to push the magnetic plate into contact with the electromagnet, by retracting the solenoid pin into the solenoid; and
the electromagnet is configured to keep the pawl disengaged from the wheel by holding the magnetic plate in contact with the electromagnet.

3. The autonomous delivery robot of claim 2, wherein:
the manual override mechanism further comprises a torsion spring disposed against a surface of the cam; and
the torsion spring is pre-loaded when the cam is rotated by the user from the first position to the second position.

4. The autonomous delivery robot of claim 3, wherein the cam is returned from the second position to the first position via the torsion spring after the magnetic plate comes into contact with the electromagnet.

5. The autonomous delivery robot of claim 1, wherein each brake module is further configured to disengage from the respective wheel to allow movement of the wheel when the power to the brake module is greater than or equal to the threshold.

6. The autonomous delivery robot of claim 5, wherein when the power to the brake module is greater than or equal to the threshold:
the solenoid is configured to (i) disengage the pawl from the wheel and (ii) push the magnetic plate into contact with the electromagnet, by retracting the solenoid pin into the solenoid; and
the electromagnet is configured to keep the pawl disengaged from the wheel by holding the magnetic plate in contact with the electromagnet.

7. The autonomous delivery robot of claim 6, wherein:
each brake module further comprises a return spring having a first end coupled to the electromagnet and having a second end coupled to the magnetic plate; and
the return spring is compressed when the magnetic plate comes into contact with the electromagnet.

8. The autonomous delivery robot of claim 7, wherein, when the power to the brake module is less than the threshold:
the electromagnet is configured to release contact with the magnetic plate; and
the return spring is configured to engage the pawl with the wheel by pushing against the magnetic plate.

9. A brake module of an autonomous delivery device comprising a plurality of wheels, the brake module comprising:

an electromagnet;
a magnetic plate;
a pawl configured to engage a wheel to stop movement of the wheel;
a solenoid comprising a solenoid pin, the solenoid pin having a first end coupled to the magnetic plate and having a second end coupled to the pawl; and
a manual override mechanism, which when enabled by a user, is configured to allow movement of the wheel when power to the brake module is less than a threshold, wherein the manual override mechanism comprises a cam disposed between the solenoid and the magnetic plate, wherein the cam is configured to disengage the pawl from the wheel when the cam is rotated by the user from a first position between the solenoid and the magnetic plate to a second position between the solenoid and the magnetic plate, wherein the brake module is configured to disable the manual override mechanism by returning the cam from the second position to the first position, when the power to the brake module is greater than or equal to the threshold.

10. The brake module of claim 9, wherein when the power to the brake module is greater than or equal to the threshold:
the solenoid is configured to push the magnetic plate into contact with the electromagnet, by retracting the solenoid pin into the solenoid; and
the electromagnet is configured to keep the pawl disengaged from the wheel by holding the magnetic plate in contact with the electromagnet.

11. The brake module of claim 10, wherein:
the manual override mechanism further comprises a torsion spring disposed against a surface of the cam; and
the torsion spring is pre-loaded when the cam is rotated by the user from the first position to the second position.

12. The brake module of claim 11, wherein the cam is returned from the second position to the first position via the torsion spring after the magnetic plate comes into contact with the electromagnet.

13. The brake module of claim 10, wherein:
the magnetic plate is separated from the electromagnet by a first distance, when the cam is in the first position;
the magnetic plate is separated from the electromagnet by a second distance, when the cam is rotated from the first position to the second position; and
the first distance is greater than the second distance.

14. The brake module of claim 13, wherein the solenoid is configured to push the magnetic plate toward the electromagnet over the second distance when the power to the brake module is greater than or equal to the threshold.

15. The brake module of claim 9, wherein the magnetic plate comprises a detent on a surface of the magnetic plate facing the cam.

16. The brake module of claim 15, wherein the cam is configured to engage the magnetic plate in the detent when the cam is rotated from the first position to the second position.

17. A brake assembly for a delivery device, comprising:
a support structure; and
a plurality of brake modules disposed within the support structure, each of the brake modules being configured to engage a different wheel of the delivery device, wherein:
each brake module comprises:
an electromagnet;
a magnetic plate;

a pawl configured to engage the wheel to stop movement of the wheel;

a solenoid comprising a solenoid pin, the solenoid pin having a first end coupled to the magnetic plate and having a second end coupled to the pawl; and a manual override mechanism, which when enabled by a user, is configured to allow movement of the wheel when power to the brake module is less than a threshold, wherein the manual override mechanism comprises a cam disposed between the solenoid and the magnetic plate, wherein the cam is configured to disengage the pawl from the wheel when the cam is rotated by the user from a first position between the solenoid and the magnetic plate to a second position between the solenoid and the magnetic plate; and each brake module is configured to disable the manual override mechanism by returning the cam from the second position to the first position, when power to the brake module is greater than or equal to the threshold.

18. The brake assembly of claim 17, wherein:

the support structure further comprises a lever for each of the plurality of brake modules;

each lever is coupled to the cam in the respective brake module; and each lever allows the user to rotate the cam between the first position and the second position.

19. The brake assembly of claim 17, wherein when the power to the brake module is greater than or equal to the threshold:

the solenoid is configured to push the magnetic plate into contact with the electromagnet, by retracting the solenoid pin into the solenoid; and the electromagnet is configured to keep the pawl disengaged from the wheel by holding the magnetic plate in contact with the electromagnet.

20. The brake assembly of claim 19, wherein:

the manual override mechanism further comprises a torsion spring disposed against a surface of the cam;

the torsion spring is pre-loaded when the cam is rotated by the user from the first position to the second position; and the cam is returned from the second position to the first position via the torsion spring after the magnetic plate comes into contact with the electromagnet.

* * * * *